(12) United States Patent
Wozniak et al.

(10) Patent No.: US 12,275,586 B1
(45) Date of Patent: Apr. 15, 2025

(54) MACHINE LEARNING APPROACH FOR RESOURCE ALLOCATION FOR ITEM HANDLING

(71) Applicant: Amazon Technologies, Inc., Seattle, WA (US)

(72) Inventors: Amanda V. Wozniak, Somerville, MA (US); Ilissa Brooke Bruser, Framingham, MA (US); Martin Jouvenot, Reading, MA (US)

(73) Assignee: Amazon Technologies, Inc., Seattle, WA (US)

( * ) Notice: Subject to any disclaimer, the term of this patent is extended or adjusted under 35 U.S.C. 154(b) by 715 days.

(21) Appl. No.: 17/408,765

(22) Filed: Aug. 23, 2021

(51) Int. Cl.
| | |
|---|---|
| *B65G 1/137* | (2006.01) |
| *B65G 1/04* | (2006.01) |
| *G06Q 10/08* | (2024.01) |
| *G06Q 10/087* | (2023.01) |

(52) U.S. Cl.
CPC ......... *B65G 1/1371* (2013.01); *B65G 1/1373* (2013.01); *G06Q 10/087* (2013.01); *B65G 1/0492* (2013.01); *G06Q 10/08* (2013.01)

(58) Field of Classification Search
CPC .... G06Q 10/087; G06Q 10/08; B65G 1/1371; B65G 1/1373; B65G 1/0492
USPC .......................................................... 705/28
See application file for complete search history.

(56) References Cited

U.S. PATENT DOCUMENTS

| | | | |
|---|---|---|---|
| 2008/0218350 A1* | 9/2008 | Flores .................... | G06Q 10/00 340/572.4 |
| 2022/0324098 A1* | 10/2022 | Edwards .................. | B25J 9/163 |

OTHER PUBLICATIONS

Srikanth, R P. How AI enabled robots are ensuring better control over inventory levels. Express Computer; Mumbai (Mar. 7, 2017). (Year: 2017).*

* cited by examiner

*Primary Examiner* — Florian M Zeender
*Assistant Examiner* — Fawaad Haider
(74) *Attorney, Agent, or Firm* — Kilpatrick Townsend & Stockton LLP

(57) ABSTRACT

Techniques for allocating resources in an item handling environment are described. In an example, a computer system determines that an item is to be transferred at an item handling station to or from a stowage unit. The computer system determines data associated with transferring the item. The data indicates at least one of: an item type, a sequence of transferring items to or from the stowage unit, capability at the item handling station associated with handling the item type, an ergonomic parameter associated with the handling, a configuration of the stowage unit, an allocation of one or more resources to handle items, or a schedule of the allocation. The computer system generates, by using the data as input to an artificial intelligence model, a set of instructions indicating an allocation of a resource to the item handling station for the transferring of the item and a timing of the allocation.

20 Claims, 16 Drawing Sheets

MACHINE LEARNING APPROACH FOR RESOURCE ALLOCATION FOR ITEM HANDLING

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become non-trivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. Additionally, expanding or reducing the size or capabilities of many inventory systems requires significant changes to existing infrastructure and equipment. As a result, the cost of incremental changes to capacity or functionality may be prohibitively expensive, limiting the ability of the system to accommodate fluctuations in system throughput.

BRIEF DESCRIPTION OF THE DRAWINGS

Various embodiments in accordance with the present disclosure will be described with reference to the drawings, in which.

DETAILED DESCRIPTION

Figure 1:
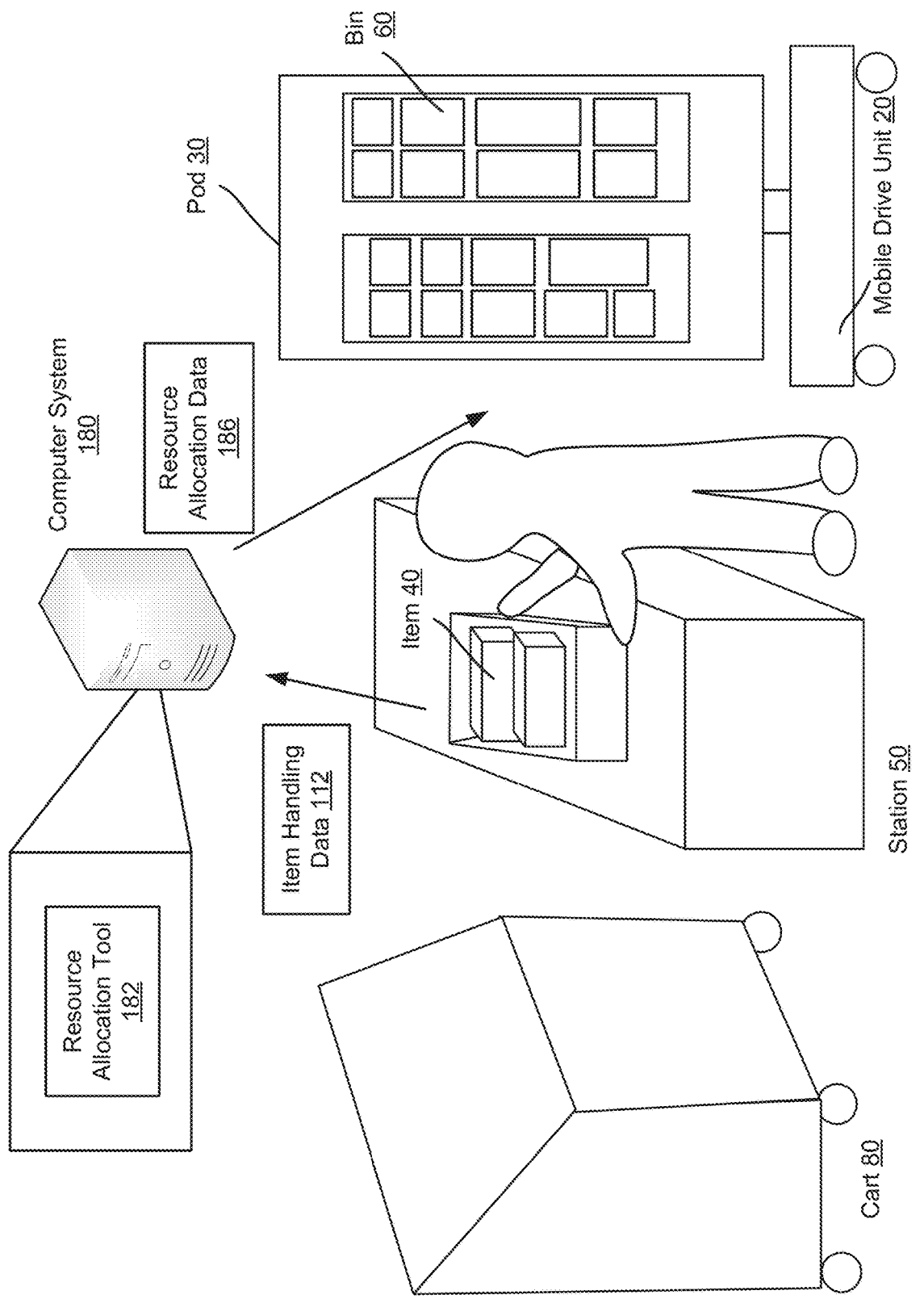
FIG. 1 illustrates an example of an item handling environment for resource allocation, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, allocating resources in an item handling environment. In an example, a computer system determines that an item is to be transferred at an item handling station to or from a stowage unit. The stowage unit may be a cart or an outbound stowage resource. The computer system determines data associated with transferring the item. The data can be actual data about the item (and, similarly, other items) such as by being retrieved from a system of the item handling environment and being applicable to and usable by components of the item handling environment to handle the item (and, similarly, the other items). This data can indicate at least one of an item type of the item, a sequence of transferring items to or from the stowage unit, capability at the item handling station associated with handling the item type, an ergonomic parameter associated with the handling, a configuration of the stowage unit, an allocation of one or more resources to handle items, or a schedule of the allocation. The computer system generates, by using the data as input to an artificial intelligence (AI) model, a set of instructions indicating an allocation of a resource to the item handling station for the transferring of the item and a timing of the allocation. For example, the computer system allocates an item stowage pod to the item handling station for receiving the item from the stowage unit.

To illustrate, consider an example of a fulfillment center that has systems configured to receive items in carts, transfer the items to item stowage pods, and pics the items from the item stowage pods for outbound transportation. For stowing the items, a computer system determines that items are to be removed from the cart at the item handling station. The computer system determines cart data, station data, pod data, and system data for the items in the cart, item stowage pods in the fulfillment center, and the item handling station. The computer system inputs the cart data, station data, pod data, and system data into an AI model that determines a set of instructions indicating that an item stowage pod is allocated to the item handling station for the stowage of the items and a timing of the allocation. A mobile drive unit can receive the set of instructions from the computer system and transport the item stowage pod to the item handling station.

Embodiments of the present disclosure provide various technological advantages. For example, by using actual data about items and different systems of an item handling facility (e.g., actual data about stations, item handling pods, stowage carts, mobile drive units, etc.) and an AI model trained on historical data associated with stowing or picking items, better resource allocations can be achieved to handle the items (e.g., stow or pick). Because of the improved resource allocation, a higher throughput of the item handling environment becomes possible. In addition, in the case of stowing items, typically such function is one step in an inbound and outbound process of items, and can become a bottleneck step that impacts the upstream and downstream systems associated with the inbound and outbound process. By improving the throughput, significant improvements can be also achieved at the upstream and downstream systems because the bottleneck may be reduced. Furthermore, station data can relate to how different types of items need to be handled according to different dimensions, including an ergonomic dimension, an operator (e.g., user of a station) level of experience dimension, and stowage/pick capability of a pod or bins in the pod. As a result, the overall user experience can be improved by matching the item handling to the needs across these dimensions.

FIG. 1 illustrates an example of an item handling environment for resource allocation, according to embodiments of the present disclosure. The item handling environment (e.g. a workspace) includes a cart 80 that stores items that are to be removed from the cart 80 at a station 50. The station 50 can be an inventory station that represents a location designated for the completion of particular tasks involving inventory items and that includes relevant systems to complete the tasks (e.g., a computer system to receive and present instructions to a user about the tasks, a scanning device to scan carts, items, bins, and/or pods, a control system to visually, haptically, and/or audibly indicate how (e.g., a sequence of stowing) items can be stowed, a control system to instruct a cart fetch for staging carts or fetching a cart to the station 50, a control system to instruct a station, a part thereof, or equipment thereof to move or interact with a mobile drive unit, and/or any other system associated with handling an item to perform a task). Such tasks may involve stowing items that are inbound to the item handling environment, including the removal of inventory items from a cart 80, the introduction of inventory items into a pod 30 (which may also be referred to as an inventory holder), the counting of inventory items in the pod 30, the decomposition of inventory items (e.g. from pallet- or case-sized groups to individual inventory items), the consolidation of inventory items between pods 30, and/or the processing or handling of inventory items in any other suitable manner.

In an example, item handling data 112 associated with the cart 80, the pod 30, the station 50, and the overall item handling environment is received by a computer system 180. The computer system 180 includes components involved in executing a resource allocation tool 182 to determine the pod 30 is to be allocated to the station 50. The item handling data 112 can be received by the computer system 180 from one or more resources (e.g., carts, stations, or pods), as further described in FIG. 10. The item handling data 112 can include information about the cart 80 that indicates an item type of one or more of the items or a packaging sequence of the items in the cart. For example, the cart data can indicate the item 40 was added in the cart 80 subsequent to a second item being added in the cart 80. Additionally, the item handling data 112 can include information about the station 50 that indicates a capability of handling the item type at the station 50 (the capability can be that of the station 50 itself and/or of an operator of the station 50) or an ergonomic parameter associated with the handling. For example, the operator at the station 50 stowing the items from the cart 80 into the pod 30 may have better historical performance (e.g., based on metrics about the operator's previous item handling) for stowing items of a particular type at a specific location in the pod 30 (e.g., heaver items being stowed lower in the pod 30). Data associated with the pod 30, such as a configuration of bins 60 in the pod 30, can also be included in the item handling data 112. The pod 30 can include multiple bins 60 (or any type of containers) of varying sizes that can each store one or more items, and different pods may include different configurations of bins. Additionally or alternatively, the pod 30 can include shelving (or any type of enclaves) to receive bins (or any type of containers) that may be initially located at the station 50 or another location. The item handling data 112 may additionally include system data that indicates location information of carts in the item handling environment, an allocation of pods to stations in the item handling environment, or a schedule of the allocation of pods to stations.

The resource allocation tool 182 receives the item handling data 112 and generates resource allocation data 186 that indicates the pod 30 is allocated to the station 50 for the stowing of the items and a timing (e.g., schedule) of the allocation. During stowing, the items can be removed from the cart 80 and placed in bins 60 (also referred to as stowage bins or storage bins) of the pod 30 according to the resource allocation data 186.

Although a stowing task is illustrated herein, the embodiments of the present disclosure are not limited as such. For example, the tasks can additionally or alternatively include picking items, such as by sending a pod 30 to a station 50, removing the items from the pod 30 at the stations, preparing the removed items for delivery (e.g., placing them in packages with proper labels), and sending the items downstream for delivery (e.g., on a conveyor belt). In this example, resource allocation data can be similarly generated to indicate the allocation of the pod 30 to the station 50 and the schedule of this allocation.

Furthermore, the resource allocation data need not be limited to pods. For example, resource allocation data can be similarly generated to indicate a bin configuration to use and a schedule, such that a pod that includes the bin configuration or that is capable of receiving the bin configuration can be deployed according to the schedule. These and other functionalities are described herein next.

Figure 2:
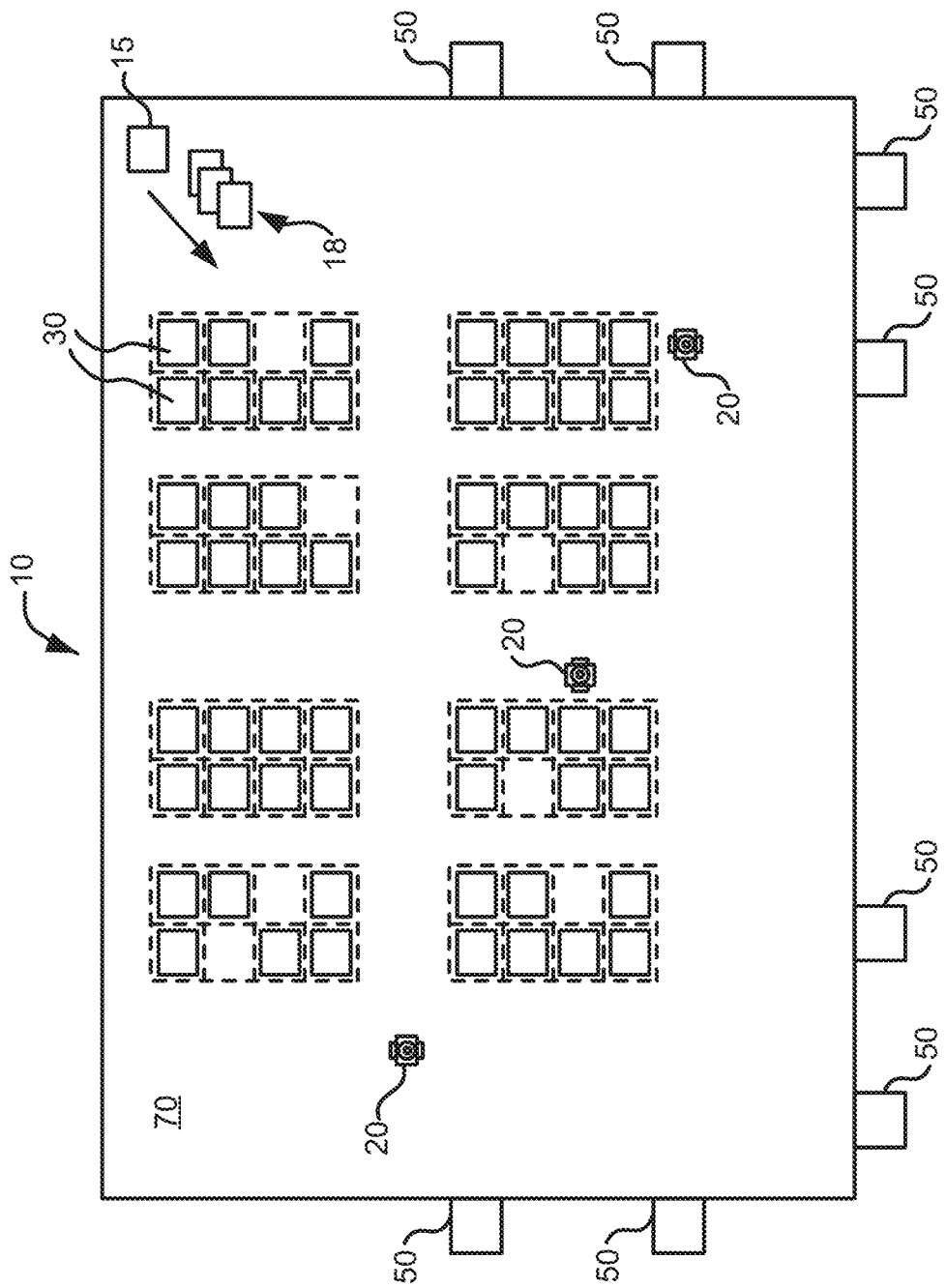
FIG. 2 illustrates components of an inventory system according to a particular embodiment.

FIG. 2 illustrates the components of an inventory system 10. Inventory system 10 includes a management module 15, one or more mobile drive units 20, one or more inventory holders 30, and one or more inventory stations 50. Mobile drive units 20 transport inventory holders 30 between points within a workspace 70 in response to commands communicated by management module 15. Each inventory holder 30 stores one or more types of inventory items. As a result, inventory system 10 is capable of moving inventory items between locations within workspace 70 to facilitate the entry, processing, and/or removal of inventory items from inventory system 10 and the completion of other tasks involving inventory items.

Management module 15 assigns tasks to appropriate components of inventory system 10 and coordinates operation of the various components in completing the tasks. These tasks may relate not only to the movement and processing of inventory items, but also to the management and maintenance of the components of inventory system 10. For example, management module 15 may assign portions of workspace 70 as parking spaces for mobile drive units 20, the scheduled recharge or replacement of mobile drive unit batteries, the storage of empty inventory holders 30, or any other operations associated with the functionality supported by inventory system 10 and its various components. Management module 15 may select components of inventory system 10 to perform these tasks and communicate appropriate commands and/or data to the selected components to facilitate completion of these operations. Although shown in FIG. 2 as a single, discrete component, management module 15 may represent multiple components and may represent or include portions of mobile drive units 20 or other elements of inventory system 10. As a result, any or all of the interactions between a particular mobile drive unit 20 and management module 15 that are described below may, in particular embodiments, represent peer-to-peer communication between that mobile drive unit 20 and one or more other mobile drive units 20. The components and operation of an example embodiment of management module 15 are discussed further below with respect to FIG. 3.

Mobile drive units 20 move inventory holders 30 between locations within workspace 70. Mobile drive units 20 may represent any devices or components appropriate for use in inventory system 10 based on the characteristics and configuration of inventory holders 30 and/or other elements of inventory system 10. In a particular embodiment of inventory system 10, mobile drive units 20 represent independent, self-powered devices configured to freely move about workspace 70. Examples of such inventory systems are disclosed in U.S. Pat. No. 9,087,314, issued on Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, mobile drive units 20 represent elements of a tracked inventory system configured to move inventory holder 30 along tracks, rails, cables, crane system, or other guidance or support elements traversing workspace 70. In such an embodiment, mobile drive units 20 may receive power and/or support through a connection to the guidance elements, such as a powered rail. Additionally, in particular embodiments of inventory system 10 mobile drive units 20 may be configured to utilize alternative conveyance equipment to move within workspace 70 and/or between separate portions of workspace 70. The components and operation of an example embodiment of a mobile drive unit 20 are discussed further below with respect to FIGS. 4 and 5.

Additionally, mobile drive units 20 may be capable of communicating with management module 15 to receive information identifying selected inventory holders 30, transmit the locations of mobile drive units 20, or exchange any other suitable information to be used by management module 15 or mobile drive units 20 during operation. Mobile drive units 20 may communicate with management module 15 wirelessly, using wired connections between mobile drive units 20 and management module 15, and/or in any other appropriate manner. As one example, particular embodiments of mobile drive unit 20 may communicate with management module 15 and/or with one another using 802.11, Bluetooth, or Infrared Data Association (IrDA) standards, or any other appropriate wireless communication protocol. As another example, in a tracked inventory system 10, tracks or other guidance elements upon which mobile drive units 20 move may be wired to facilitate communication between mobile drive units 20 and other components of inventory system 10. Furthermore, as noted above, management module 15 may include components of individual mobile drive units 20. Thus, for the purposes of this description and the claims that follow, communication between management module 15 and a particular mobile drive unit 20 may represent communication between components of a particular mobile drive unit 20. In general, mobile drive units 20 may be powered, propelled, and controlled in any manner appropriate based on the configuration and characteristics of inventory system 10.

Inventory holders 30 store inventory items. In a particular embodiment, inventory holders 30 include multiple storage bins with each storage bin capable of holding one or more types of inventory items. Inventory holders 30 are capable of being carried, rolled, and/or otherwise moved by mobile drive units 20. In particular embodiments, inventory holder 30 may provide additional propulsion to supplement that provided by mobile drive unit 20 when moving inventory holder 30.

Additionally, in particular embodiments, inventory items 40 may also hang from hooks or bars (not shown) within or on inventory holder 30. In general, inventory holder 30 may store inventory items 40 in any appropriate manner within inventory holder 30 and/or on the external surface of inventory holder 30.

Additionally, each inventory holder 30 may include a plurality of faces, and each bin may be accessible through one or more faces of the inventory holder 30. For example, in a particular embodiment, inventory holder 30 includes four faces. In such an embodiment, bins located at a corner of two faces may be accessible through either of those two faces, while each of the other bins is accessible through an opening in one of the four faces. Mobile drive unit 20 may be configured to rotate inventory holder 30 at appropriate times to present a particular face and the bins associated with that face to an operator or other components of inventory system 10.

Inventory items represent any objects suitable for storage, retrieval, and/or processing in an automated inventory system 10. For the purposes of this description, "inventory items" may represent any one or more objects of a particular type that are stored in inventory system 10. Thus, a particular inventory holder 30 is currently "storing" a particular inventory item if the inventory holder 30 currently holds one or more units of that type. As one example, inventory system 10 may represent a mail order warehouse facility, and inventory items may represent merchandise stored in the warehouse facility. During operation, mobile drive units 20 may retrieve inventory holders 30 containing one or more inventory items requested in an order to be packed for delivery to a customer or inventory holders 30 carrying pallets containing aggregated collections of inventory items for shipment. Moreover, in particular embodiments of inventory system 10, boxes containing completed orders may themselves represent inventory items.

In particular embodiments, inventory system 10 may also include one or more inventory stations 50. Inventory stations 50 represent locations designated for the completion of particular tasks involving inventory items. Such tasks may include the removal of inventory items from inventory holders 30, the introduction of inventory items into inventory holders 30, the counting of inventory items in inventory holders 30, the decomposition of inventory items (e.g. from pallet- or case-sized groups to individual inventory items), the consolidation of inventory items between inventory holders 30, and/or the processing or handling of inventory items in any other suitable manner. In particular embodiments, inventory stations 50 may just represent the physical locations where a particular task involving inventory items can be completed within workspace 70. In alternative embodiments, inventory stations 50 may represent both the physical location and also any appropriate equipment for processing or handling inventory items, such as scanners for monitoring the flow of inventory items in and out of inventory system 10, communication interfaces for communicating with management module 15, and/or any other suitable components. Inventory stations 50 may be controlled, entirely or in part, by human operators or may be fully automated. Moreover, the human or automated operators of inventory stations 50 may be capable of performing certain tasks to inventory items, such as packing, counting, or transferring inventory items, as part of the operation of inventory system 10.

Workspace 70 represents an area associated with inventory system 10 in which mobile drive units 20 can move and/or inventory holders 30 can be stored. For example, workspace 70 may represent all or part of the floor of a mail-order warehouse in which inventory system 10 operates. Although FIG. 2 shows, for the purposes of illustration, an embodiment of inventory system 10 in which workspace 70 includes a fixed, predetermined, and finite physical space, particular embodiments of inventory system 10 may include mobile drive units 20 and inventory holders 30 that are configured to operate within a workspace 70 that is of variable dimensions and/or an arbitrary geometry. While FIG. 2 illustrates a particular embodiment of inventory system 10 in which workspace 70 is entirely enclosed in a building, alternative embodiments may utilize workspaces 70 in which some or all of the workspace 70 is located outdoors, within a vehicle (such as a cargo ship), or otherwise unconstrained by any fixed structure.

In operation, management module 15 selects appropriate components to complete particular tasks and transmits task assignments 18 to the selected components to trigger completion of the relevant tasks. Each task assignment 18 defines one or more tasks to be completed by a particular component. These tasks may relate to the retrieval, storage, replenishment, and counting of inventory items and/or the management of mobile drive units 20, inventory holders 30, inventory stations 50 and other components of inventory system 10. Depending on the component and the task to be completed, a particular task assignment 18 may identify locations, components, and/or actions associated with the corresponding task and/or any other appropriate information to be used by the relevant component in completing the assigned task.

In particular embodiments, management module 15 generates task assignments 18 based, in part, on inventory requests that management module 15 receives from other components of inventory system 10 and/or from external components in communication with management module 15. These inventory requests identify particular operations to be completed involving inventory items stored or to be stored within inventory system 10 and may represent communication of any suitable form. For example, in particular embodiments, an inventory request may represent a shipping order specifying particular inventory items that have been purchased by a customer and that are to be retrieved from inventory system 10 for shipment to the customer. Management module 15 may also generate task assignments 18 independently of such inventory requests, as part of the overall management and maintenance of inventory system 10. For example, management module 15 may generate task assignments 18 in response to the occurrence of a particular event (e.g., in response to a mobile drive unit 20 requesting a space to park), according to a predetermined schedule (e.g., as part of a daily start-up routine), or at any appropriate time based on the configuration and characteristics of inventory system 10. After generating one or more task assignments 18, management module 15 transmits the generated task assignments 18 to appropriate components for completion of the corresponding task. The relevant components then execute their assigned tasks.

With respect to mobile drive units 20 specifically, management module 15 may, in particular embodiments, communicate task assignments 18 to selected mobile drive units 20 that identify one or more destinations for the selected mobile drive units 20. Management module 15 may select a mobile drive unit 20 to assign the relevant task based on the location or state of the selected mobile drive unit 20, an indication that the selected mobile drive unit 20 has completed a previously-assigned task, a predetermined schedule, and/or any other suitable consideration. These destinations may be associated with an inventory request the management module 15 is executing or a management objective the management module 15 is attempting to fulfill. For example, the task assignment may define the location of an inventory holder 30 to be retrieved, an inventory station 50 to be visited, a storage location where the mobile drive unit 20 should park until receiving another task, or a location associated with any other task appropriate based on the configuration, characteristics, and/or state of inventory system 10, as a whole, or individual components of inventory system 10. For example, in particular embodiments, such decisions may be based on the popularity of particular inventory items, the staffing of a particular inventory station 50, the tasks currently assigned to a particular mobile drive unit 20, and/or any other appropriate considerations.

As part of completing these tasks mobile drive units 20 may dock with and transport inventory holders 30 within workspace 70. Mobile drive units 20 may dock with inventory holders 30 by connecting to, lifting, and/or otherwise interacting with inventory holders 30 in any other suitable manner so that, when docked, mobile drive units 20 are coupled to and/or support inventory holders 30 and can move inventory holders 30 within workspace 70. While the description below focuses on particular embodiments of mobile drive unit 20 and inventory holder 30 that are configured to dock in a particular manner, alternative embodiments of mobile drive unit 20 and inventory holder 30 may be configured to dock in any manner suitable to allow mobile drive unit 20 to move inventory holder 30 within workspace 70. Additionally, as noted below, in particular embodiments, mobile drive units 20 represent all or portions of inventory holders 30. In such embodiments, mobile drive units 20 may not dock with inventory holders 30 before transporting inventory holders 30 and/or mobile drive units 20 may each remain continually docked with a particular inventory holder 30.

While the appropriate components of inventory system 10 complete assigned tasks, management module 15 may interact with the relevant components to ensure the efficient use of space, equipment, manpower, and other resources available to inventory system 10. As one specific example of such interaction, management module 15 is responsible, in particular embodiments, for planning the paths mobile drive units 20 take when moving within workspace 70 and for allocating use of a particular portion of workspace 70 to a particular mobile drive unit 20 for purposes of completing an assigned task. In such embodiments, mobile drive units 20 may, in response to being assigned a task, request a path to a particular destination associated with the task. Moreover, while the description below focuses on one or more embodiments in which mobile drive unit 20 requests paths from management module 15, mobile drive unit 20 may, in alternative embodiments, generate its own paths.

Components of inventory system 10 may provide information to management module 15 regarding their current state, other components of inventory system 10 with which they are interacting, and/or other conditions relevant to the operation of inventory system 10. This may allow management module 15 to utilize feedback from the relevant components to update algorithm parameters, adjust policies, or otherwise modify its decision-making to respond to changes in operating conditions or the occurrence of particular events.

In addition, while management module 15 may be configured to manage various aspects of the operation of the components of inventory system 10, in particular embodiments, the components themselves may also be responsible for decision-making relating to certain aspects of their operation, thereby reducing the processing load on management module 15.

Thus, based on its knowledge of the location, current state, and/or other characteristics of the various components of inventory system 10 and an awareness of all the tasks currently being completed, management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 10 may be able to support a number of techniques for efficiently executing various aspects of the operation of inventory system 10. As a result, particular embodiments of management module 15 may, by implementing one or more management techniques described below, enhance the efficiency of inventory system 10 and/or provide other operational benefits.

Figure 3:
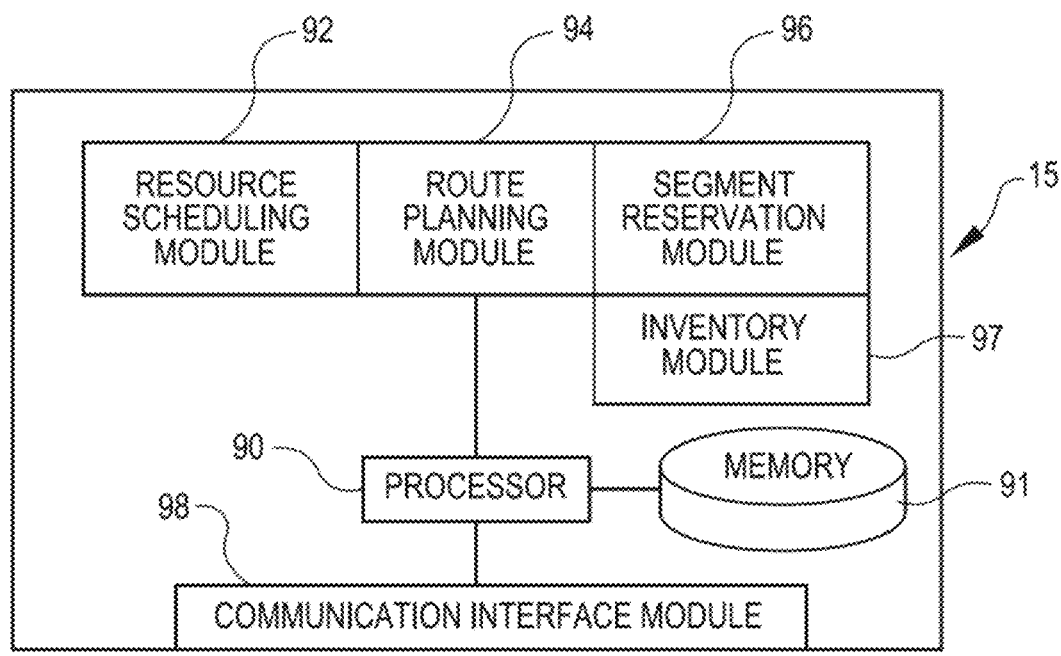
FIG. 3 illustrates in greater detail the components of an example management module that may be utilized in particular embodiments of the inventory system shown in FIG. 2.

FIG. 3 illustrates in greater detail the components of a particular embodiment of management module 15. As shown, the example embodiment includes a resource scheduling module 92, a route planning module 94, a segment reservation module 96, an inventory module 97, a communication interface module 98, a processor 90, and a memory 91. Management module 15 may represent a single component, multiple components located at a central location within inventory system 10, or multiple components distributed throughout inventory system 10. For example, management module 15 may represent components of one or more mobile drive units 20 that are capable of communicating information between the mobile drive units 20 and coordinating the movement of mobile drive units 20 within workspace 70. In general, management module 15 may include any appropriate combination of hardware and/or software suitable to provide the described functionality.

Processor 90 is operable to execute instructions associated with the functionality provided by management module 15. Processor 90 may comprise one or more general purpose computers, dedicated microprocessors, or other processing devices capable of communicating electronic information. Examples of processor 90 include one or more application-specific integrated circuits (ASICs), field programmable gate arrays (FPGAs), digital signal processors (DSPs) and any other suitable specific or general purpose processors.

Memory 91 stores processor instructions, inventory requests, reservation information, state information for the various components of inventory system 10 and/or any other appropriate values, parameters, or information utilized by management module 15 during operation. Memory 91 may represent any collection and arrangement of volatile or nonvolatile, local or remote devices suitable for storing data. Examples of memory 91 include, but are not limited to, random access memory (RAM) devices, read only memory (ROM) devices, magnetic storage devices, optical storage devices or any other suitable data storage devices.

Resource scheduling module 92 processes received inventory requests and generates one or more assigned tasks to be completed by the components of inventory system 10. Resource scheduling module 92 may also select one or more appropriate components for completing the assigned tasks and, using communication interface module 98, communicate the assigned tasks to the relevant components. Additionally, resource scheduling module 92 may also be responsible for generating assigned tasks associated with various management operations, such as prompting mobile drive units 20 to recharge batteries or have batteries replaced, instructing inactive mobile drive units 20 to park in a location outside the anticipated traffic flow or a location near the anticipated site of future tasks, and/or directing mobile drive units 20 selected for repair or maintenance to move towards a designated maintenance station.

Route planning module 94 receives route requests from mobile drive units 20. These route requests identify one or more destinations associated with a task the requesting mobile drive unit 20 is executing. In response to receiving a route request, route planning module 94 generates a path to one or more destinations identified in the route request. Route planning module 94 may implement any appropriate algorithms utilizing any appropriate parameters, factors, and/or considerations to determine the appropriate path. After generating an appropriate path, route planning module 94 transmits a route response identifying the generated path to the requesting mobile drive unit 20 using communication interface module 98.

Segment reservation module 96 receives reservation requests from mobile drive units 20 attempting to move along paths generated by route planning module 94. These reservation requests request the use of a particular portion of workspace 70 (referred to herein as a "segment") to allow the requesting mobile drive unit 20 to avoid collisions with other mobile drive units 20 while moving across the reserved segment. In response to received reservation requests, segment reservation module 96 transmits a reservation response granting or denying the reservation request to the requesting mobile drive unit 20 using the communication interface module 98.

The inventory module 97 maintains information about the location and number of inventory items 40 in the inventory system 10. Information can be maintained about the number of inventory items 40 in a particular inventory holder 30, and the maintained information can include the location of those inventory items 40 in the inventory holder 30. The inventory module 97 can also communicate with the mobile drive units 20, utilizing task assignments 18 to maintain, replenish or move inventory items 40 within the inventory system 10.

Communication interface module 98 facilitates communication between management module 15 and other components of inventory system 10, including reservation responses, reservation requests, route requests, route responses, and task assignments. These reservation responses, reservation requests, route requests, route responses, and task assignments may represent communication of any form appropriate based on the capabilities of management module 15 and may include any suitable information. Depending on the configuration of management module 15, communication interface module 98 may be responsible for facilitating either or both of wired and wireless communication between management module 15 and the various components of inventory system 10. In particular embodiments, management module 15 may communicate using communication protocols such as 802.11, Bluetooth, or Infrared Data Association (IrDA) standards. Furthermore, management module 15 may, in particular embodiments, represent a portion of mobile drive unit 20 or other components of inventory system 10. In such embodiments, communication interface module 98 may facilitate communication between management module 15 and other parts of the same system component.

In general, resource scheduling module 92, route planning module 94, segment reservation module 96, inventory module 97, and communication interface module 98 may each represent any appropriate hardware and/or software suitable to provide the described functionality. In addition, as noted above, management module 15 may, in particular embodiments, represent multiple different discrete components and any or all of resource scheduling module 92, route planning module 94, segment reservation module 96, inventory module 97, and communication interface module 98 may represent components physically separate from the remaining elements of management module 15. Moreover, any two or more of resource scheduling module 92, route planning module 94, segment reservation module 96, inventory module 97, and communication interface module 98 may share common components. For example, in particular embodiments, resource scheduling module 92, route planning module 94, segment reservation module 96, and inventory module 97 represent computer processes executing on processor 90 and communication interface module 98 comprises a wireless transmitter, a wireless receiver, and a related computer process executing on processor 90.

Figure 4:
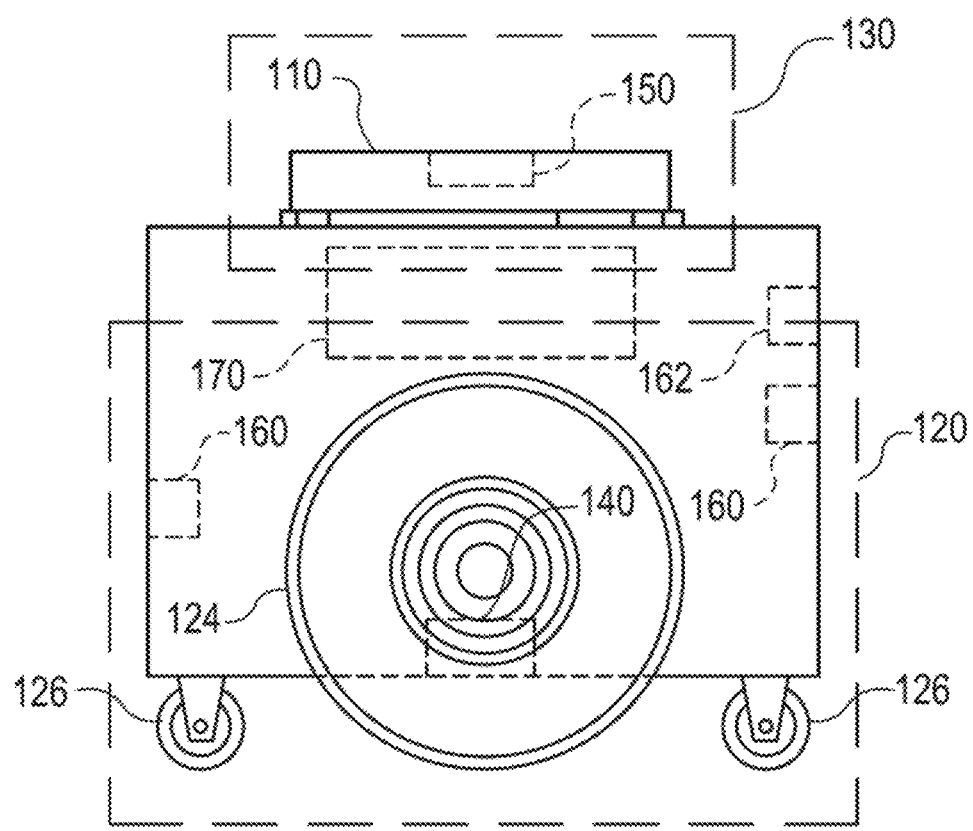
FIGS. 4 and 5 illustrate in greater detail an example mobile drive unit that may be utilized in particular embodiments of the inventory system shown in FIG. 2.
Figure 5:
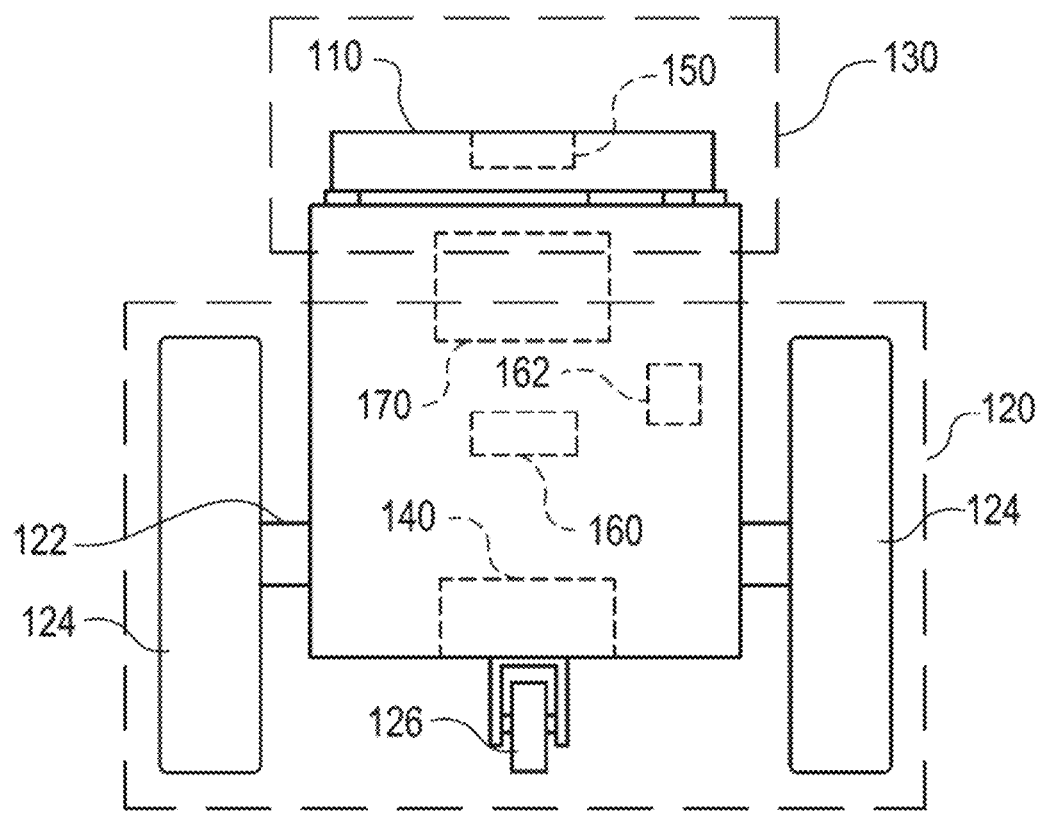

FIGS. 4 and 5 illustrate in greater detail the components of a particular embodiment of mobile drive unit 20. In particular, FIGS. 4 and 5 include a front and side view of an example mobile drive unit 20. Mobile drive unit 20 includes a docking head 110, a drive module 120, a docking actuator 130, and a control module 170. Additionally, mobile drive unit 20 may include one or more sensors configured to detect or determine the location of mobile drive unit 20, inventory holder 30, and/or other appropriate elements of inventory system 10. In the illustrated embodiment, mobile drive unit 20 includes a position sensor 140, a holder sensor 150, an obstacle sensor 160, and an identification signal transmitter 162.

Docking head 110, in particular embodiments of mobile drive unit 20, couples mobile drive unit 20 to inventory holder 30 and/or supports inventory holder 30 when mobile drive unit 20 is docked to inventory holder 30. Docking head 110 may additionally allow mobile drive unit 20 to maneuver inventory holder 30, such as by lifting inventory holder 30, propelling inventory holder 30, rotating inventory holder 30, and/or moving inventory holder 30 in any other appropriate manner. Docking head 110 may also include any appropriate combination of components, such as ribs, spikes, and/or corrugations, to facilitate such manipulation of inventory holder 30. For example, in particular embodiments, docking head 110 may include a high-friction portion that abuts a portion of inventory holder 30 while mobile drive unit 20 is docked to inventory holder 30. In such embodiments, frictional forces created between the high-friction portion of docking head 110 and a surface of inventory holder 30 may induce translational and rotational movement in inventory holder 30 when docking head 110 moves and rotates, respectively. As a result, mobile drive unit 20 may be able to manipulate inventory holder 30 by moving or rotating docking head 110, either independently or as a part of the movement of mobile drive unit 20 as a whole.

Drive module 120 propels mobile drive unit 20 and, when mobile drive unit 20 and inventory holder 30 are docked, inventory holder 30. Drive module 120 may represent any appropriate collection of components operable to propel mobile drive unit 20. For example, in the illustrated embodiment, drive module 120 includes motorized axle 122, a pair of motorized wheels 124, and a pair of stabilizing wheels 126. One motorized wheel 124 is located at each end of motorized axle 122, and one stabilizing wheel 126 is positioned at each end of mobile drive unit 20.

Docking actuator 130 moves docking head 110 towards inventory holder 30 to facilitate docking of mobile drive unit 20 and inventory holder 30. Docking actuator 130 may also be capable of adjusting the position or orientation of docking head 110 in other suitable manners to facilitate docking. Docking actuator 130 may include any appropriate components, based on the configuration of mobile drive unit 20 and inventory holder 30, for moving docking head 110 or otherwise adjusting the position or orientation of docking head 110. For example, in the illustrated embodiment, docking actuator 130 includes a motorized shaft (not shown) attached to the center of docking head 110. The motorized shaft is operable to lift docking head 110 as appropriate for docking with inventory holder 30.

Drive module 120 may be configured to propel mobile drive unit 20 in any appropriate manner. For example, in the illustrated embodiment, motorized wheels 124 are operable to rotate in a first direction to propel mobile drive unit 20 in a forward direction. Motorized wheels 124 are also operable to rotate in a second direction to propel mobile drive unit 20 in a backward direction. In the illustrated embodiment, drive module 120 is also configured to rotate mobile drive unit 20 by rotating motorized wheels 124 in different directions from one another or by rotating motorized wheels 124 at different speeds from one another.

Position sensor 140 represents one or more sensors, detectors, or other components suitable for determining the location of mobile drive unit 20 in any appropriate manner. For example, in particular embodiments, the workspace 70 associated with inventory system 10 includes a number of fiducial marks that mark points on a two-dimensional grid that covers all or a portion of workspace 70. In such embodiments, position sensor 140 may include a camera and suitable image- and/or video-processing components, such as an appropriately-programmed digital signal processor, to allow position sensor 140 to detect fiducial marks within the camera's field of view. Control module 170 may store location information that position sensor 140 updates as position sensor 140 detects fiducial marks. As a result, position sensor 140 may utilize fiducial marks to maintain an accurate indication of the location mobile drive unit 20 and to aid in navigation when moving within workspace 70.

Holder sensor 150 represents one or more sensors, detectors, or other components suitable for detecting inventory holder 30 and/or determining, in any appropriate manner, the location of inventory holder 30, as an absolute location or as a position relative to mobile drive unit 20. Holder sensor 150 may be capable of detecting the location of a particular portion of inventory holder 30 or inventory holder 30 as a whole. Mobile drive unit 20 may then use the detected information for docking with or otherwise interacting with inventory holder 30.

Obstacle sensor 160 represents one or more sensors capable of detecting objects located in one or more different directions in which mobile drive unit 20 is capable of moving. Obstacle sensor 160 may utilize any appropriate components and techniques, including optical, radar, sonar, pressure-sensing and/or other types of detection devices appropriate to detect objects located in the direction of travel of mobile drive unit 20. In particular embodiments, obstacle sensor 160 may transmit information describing objects it detects to control module 170 to be used by control module 170 to identify obstacles and to take appropriate remedial actions to prevent mobile drive unit 20 from colliding with obstacles and/or other objects.

Obstacle sensor 160 may also detect signals transmitted by other mobile drive units 20 operating in the vicinity of the illustrated mobile drive unit 20. For example, in particular embodiments of inventory system 10, one or more mobile drive units 20 may include an identification signal transmitter 162 that transmits a drive identification signal. The drive identification signal indicates to other mobile drive units 20 that the object transmitting the drive identification signal is in fact a mobile drive unit. Identification signal transmitter 162 may be capable of transmitting infrared, ultraviolet, audio, visible light, radio, and/or other suitable signals that indicate to recipients that the transmitting device is a mobile drive unit 20.

Additionally, in particular embodiments, obstacle sensor 160 may also be capable of detecting state information transmitted by other mobile drive units 20. For example, in particular embodiments, identification signal transmitter 162 may be capable of including state information relating to mobile drive unit 20 in the transmitted identification signal. This state information may include, but is not limited to, the position, velocity, direction, and the braking capabilities of the transmitting mobile drive unit 20. In particular embodiments, mobile drive unit 20 may use the state information transmitted by other mobile drive units to avoid collisions when operating in close proximity with those other mobile drive units.

Control module 170 monitors and/or controls operation of drive module 120 and docking actuator 130. Control module 170 may also receive information from sensors such as position sensor 140 and holder sensor 150 and adjust the operation of drive module 120, docking actuator 130, and/or other components of mobile drive unit 20 based on this information. Additionally, in particular embodiments, mobile drive unit 20 may be configured to communicate with a management device of inventory system 10 and control module 170 may receive commands transmitted to mobile drive unit 20 and communicate information back to the management device utilizing appropriate communication components of mobile drive unit 20. Control module 170 may include any appropriate hardware and/or software suitable to provide the described functionality. In particular embodiments, control module 170 includes a general-purpose microprocessor programmed to provide the described functionality. Additionally, control module 170 may include all or portions of docking actuator 130, drive module 120, position sensor 140, and/or holder sensor 150, and/or share components with any of these elements of mobile drive unit 20.

Moreover, in particular embodiments, control module 170 may include hardware and software located in components that are physically distinct from the device that houses drive module 120, docking actuator 130, and/or the other components of mobile drive unit 20 described above. For example, in particular embodiments, each mobile drive unit 20 operating in inventory system 10 may be associated with a software process (referred to here as a "drive agent") operating on a server that is in communication with the device that houses drive module 120, docking actuator 130, and other appropriate components of mobile drive unit 20. This drive agent may be responsible for requesting and receiving tasks, requesting and receiving routes, transmitting state information associated with mobile drive unit 20, and/or otherwise interacting with management module 15 and other components of inventory system 10 on behalf of the device that physically houses drive module 120, docking actuator 130, and the other appropriate components of mobile drive unit 20. As a result, for the purposes of this description and the claims that follow, the term "mobile drive unit" includes software and/or hardware, such as agent processes, that provides the described functionality on behalf of mobile drive unit 20 but that may be located in physically distinct devices from the drive module 120, docking actuator 130, and/or the other components of mobile drive unit 20 described above.

While FIGS. 4 and 5 illustrate a particular embodiment of mobile drive unit 20 containing certain components and configured to operate in a particular manner, mobile drive unit 20 may represent any appropriate component and/or collection of components configured to transport and/or facilitate the transport of inventory holders 30. As another example, mobile drive unit 20 may represent part of an overhead crane system in which one or more crane assemblies are capable of moving within a network of wires or rails to a position suitable to dock with a particular inventory holder 30. After docking with inventory holder 30, the crane assembly may then lift inventory holder 30 and move inventory to another location for purposes of completing an assigned task.

Furthermore, in particular embodiments, mobile drive unit 20 may represent all or a portion of inventory holder 30. Inventory holder 30 may include motorized wheels or any other components suitable to allow inventory holder 30 to propel itself. As one specific example, a portion of inventory holder 30 may be responsive to magnetic fields. Inventory system 10 may be able to generate one or more controlled magnetic fields capable of propelling, maneuvering and/or otherwise controlling the position of inventory holder 30 as a result of the responsive portion of inventory holder 30. In such embodiments, mobile drive unit 20 may represent the responsive portion of inventory holder 30 and/or the components of inventory system 10 responsible for generating and controlling these magnetic fields. While this description provides several specific examples, mobile drive unit 20 may, in general, represent any appropriate component and/or collection of components configured to transport and/or facilitate the transport of inventory holders 30.

Figure 6:
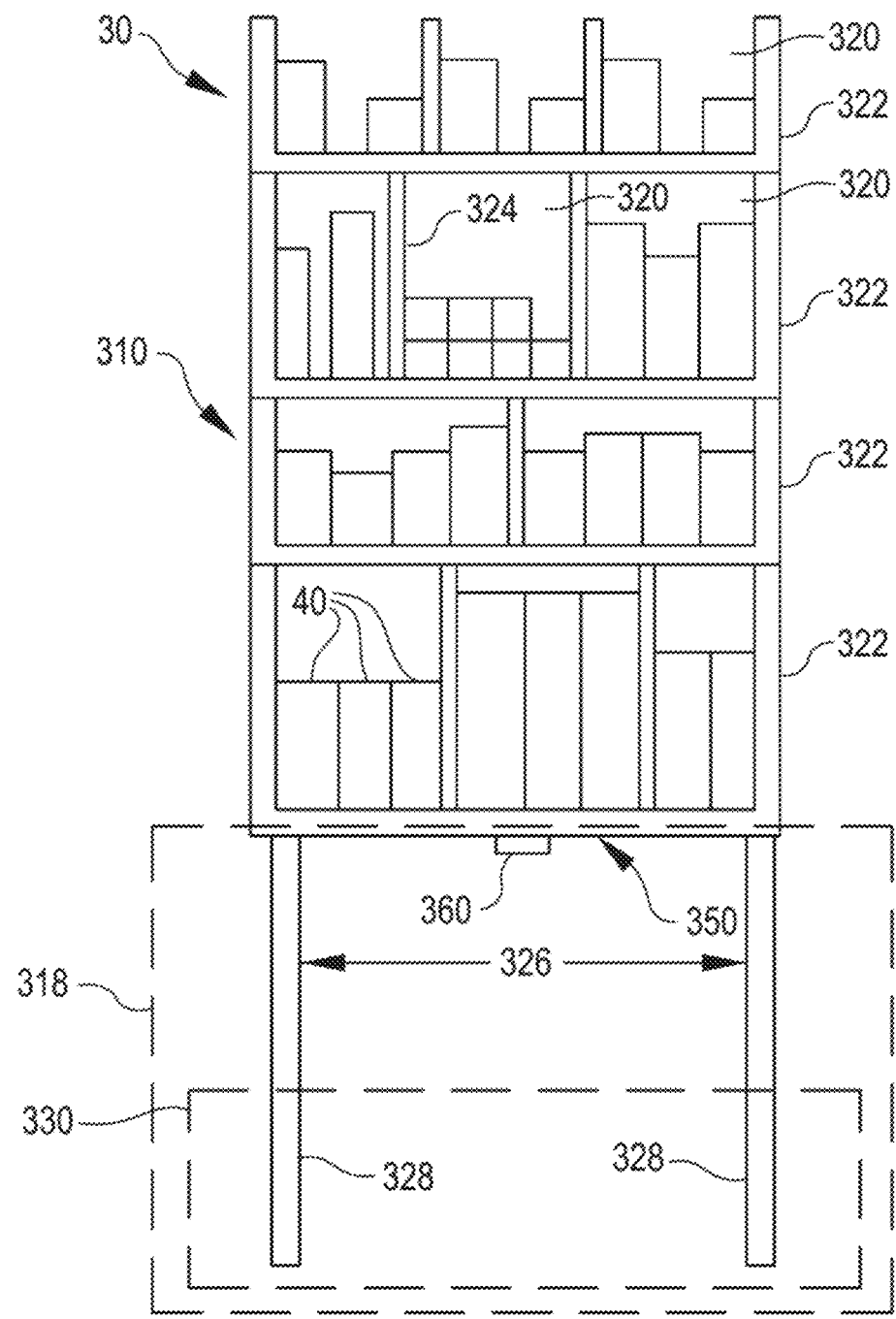
FIG. 6 illustrates in greater detail an example inventory holder that may be utilized in particular embodiments of the inventory system shown in FIG. 2.

FIG. 6 illustrates in greater detail the components of a particular embodiment of inventory holder 30. In particular, FIG. 6 illustrates the structure and contents of one side of an example inventory holder 30. In a particular embodiment, inventory holder 30 may comprise any number of faces with similar or different structure. As illustrated, inventory holder 30 includes a frame 310, a plurality of legs 328, and a docking surface 350.

Frame 310 holds inventory items 40. Frame 310 provides storage space for storing inventory items 40 external or internal to frame 310. The storage space provided by frame 310 may be divided into a plurality of inventory bins 320, each capable of holding inventory items 40. Inventory bins 320 may include any appropriate storage elements, such as bins, compartments, or hooks.

In a particular embodiment, frame 310 is composed of a plurality of trays 322 stacked upon one another and attached to or stacked on a base 318. In such an embodiment, inventory bins 320 may be formed by a plurality of adjustable dividers 324 that may be moved to resize one or more inventory bins 320. In alternative embodiments, frame 310 may represent a single inventory bin 320 that includes a single tray 322 and no adjustable dividers 324. Additionally, in particular embodiments, frame 310 may represent a load-bearing surface mounted on mobility element 330. Inventory items 40 may be stored on such an inventory holder 30 by being placed on frame 310. In general, frame 310 may include internal and/or external storage space divided into any appropriate number of inventory bins 320 in any appropriate manner.

Additionally, in a particular embodiment, frame 310 may include a plurality of device openings 326 that allow mobile drive unit 20 to position docking head 110 adjacent docking surface 350. The size, shape, and placement of device openings 326 may be determined based on the size, the shape, and other characteristics of the particular embodiment of mobile drive unit 20 and/or inventory holder 30 utilized by inventory system 10. For example, in the illustrated embodiment, frame 310 includes four legs 328 that form device openings 326 and allow mobile drive unit 20 to position mobile drive unit 20 under frame 310 and adjacent to docking surface 350. The length of legs 328 may be determined based on a height of mobile drive unit 20.

Docking surface 350 comprises a portion of inventory holder 30 that couples to, abuts, and/or rests upon a portion of docking head 110, when mobile drive unit 20 is docked to inventory holder 30. Additionally, docking surface 350 supports a portion or all of the weight of inventory holder 30 while inventory holder 30 is docked with mobile drive unit 20. The composition, shape, and/or texture of docking surface 350 may be designed to facilitate maneuvering of inventory holder 30 by mobile drive unit 20. For example, as noted above, in particular embodiments, docking surface 350 may comprise a high-friction portion. When mobile drive unit 20 and inventory holder 30 are docked, frictional forces induced between docking head 110 and this high-friction portion may allow mobile drive unit 20 to maneuver inventory holder 30. Additionally, in particular embodiments, docking surface 350 may include appropriate components suitable to receive a portion of docking head 110, couple inventory holder 30 to mobile drive unit 20, and/or facilitate control of inventory holder 30 by mobile drive unit 20.

Holder identifier 360 marks a predetermined portion of inventory holder 30 and mobile drive unit 20 may use holder identifier 360 to align with inventory holder 30 during docking and/or to determine the location of inventory holder 30. More specifically, in particular embodiments, mobile drive unit 20 may be equipped with components, such as holder sensor 150, that can detect holder identifier 360 and determine its location relative to mobile drive unit 20. As a result, mobile drive unit 20 may be able to determine the location of inventory holder 30 as a whole. For example, in particular embodiments, holder identifier 360 may represent a reflective marker that is positioned at a predetermined location on inventory holder 30 and that holder sensor 150 can optically detect using an appropriately-configured camera.

Depending on the configuration and characteristics of mobile drive unit 20 and inventory system 10, mobile drive unit 20 may move inventory holder 30 using a variety of appropriate methods. In a particular embodiment, mobile drive unit 20 is capable of moving inventory holder 30 along a two-dimensional grid, combining movement along straight-line segments with ninety-degree rotations and arcing paths to transport inventory holder 30 from the first location to the second location. Additionally, while moving, mobile drive unit 20 may use fixed objects located in the workspace as reference points to assist in navigation. For example, in particular embodiments, inventory system 10 includes multiple fiducial marks. Mobile drive unit 20 may be configured to detect fiducial marks and to determine the location of mobile drive unit 20 and/or measure its movement based on the detection of fiducial marks.

After mobile drive unit 20 arrives at the second location, mobile drive unit 20 may perform appropriate operations to facilitate access to inventory items 40 stored in inventory holder 30. For example, mobile drive unit 20 may rotate inventory holder 30 to present a particular face of inventory holder 30 to an operator of inventory system 10 or other suitable party, such as a packer selecting inventory items 40 from inventory holder 30. Mobile drive unit 20 may also undock from inventory holder 30. Alternatively, instead of undocking at the second location, mobile drive unit 20 may transport inventory holder 30 back to the first location or to a third location after any appropriate actions have been taken involving inventory items 40. For example, after a packer has removed particular inventory items 40 from inventory holder 30, mobile drive unit 20 may return inventory holder 30 to its original storage location, a new storage location, or another inventory station. Mobile drive unit 20 may then undock from inventory holder 30 at this new location.

Figure 7:
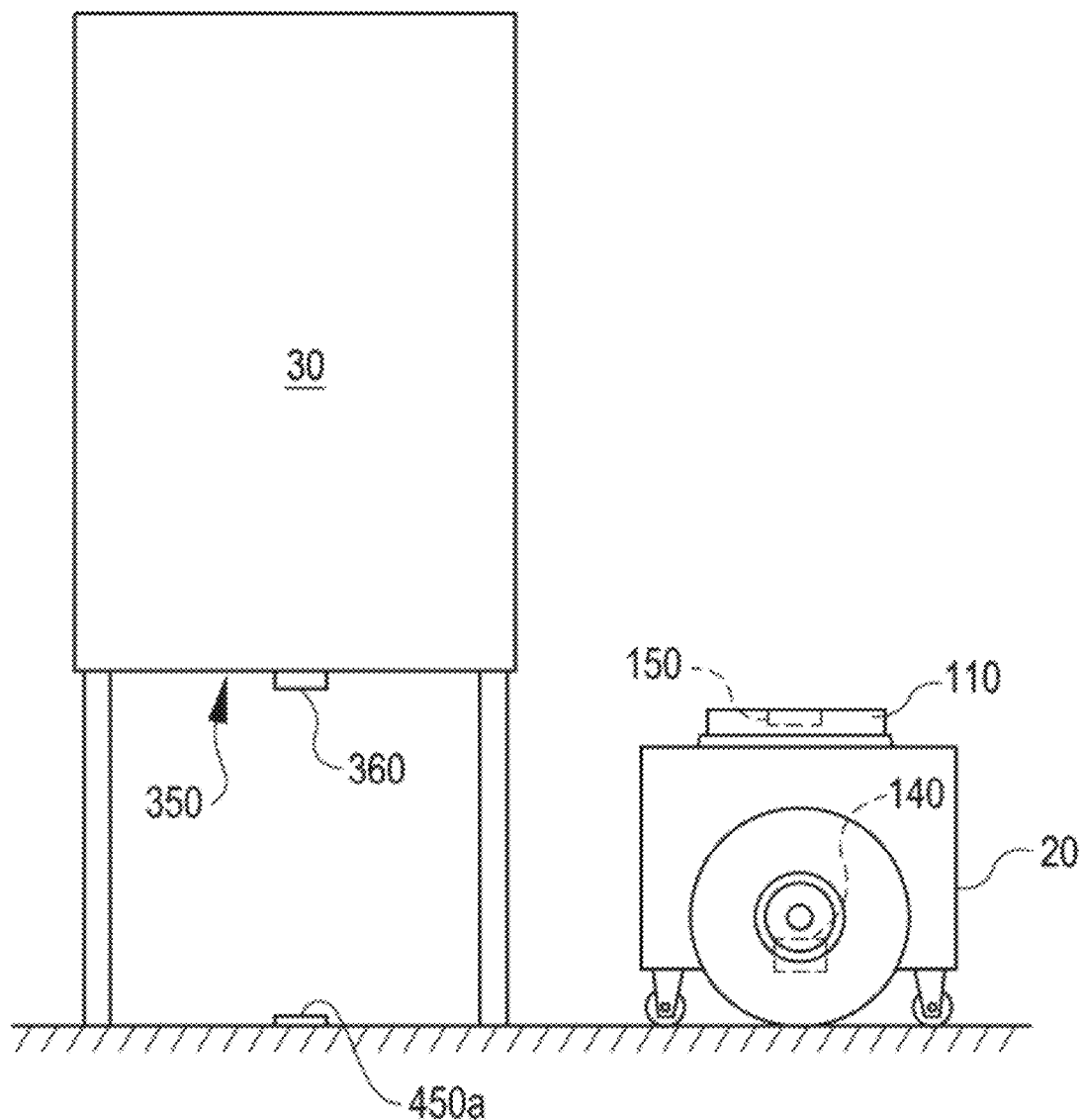
FIGS. 7-9 show operation of various components of the mobile drive unit and the inventory holder during docking, movement and undocking.
Figure 8:
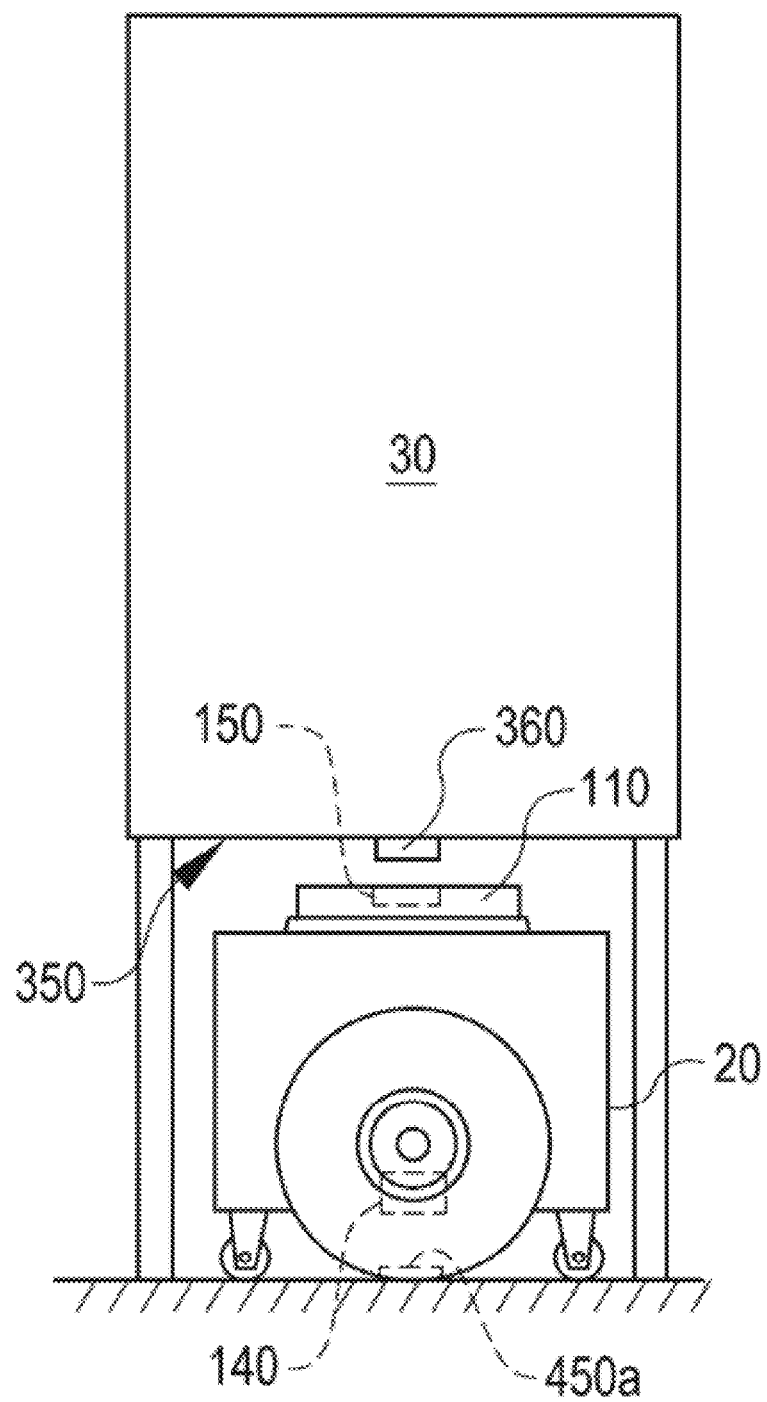
Figure 9:
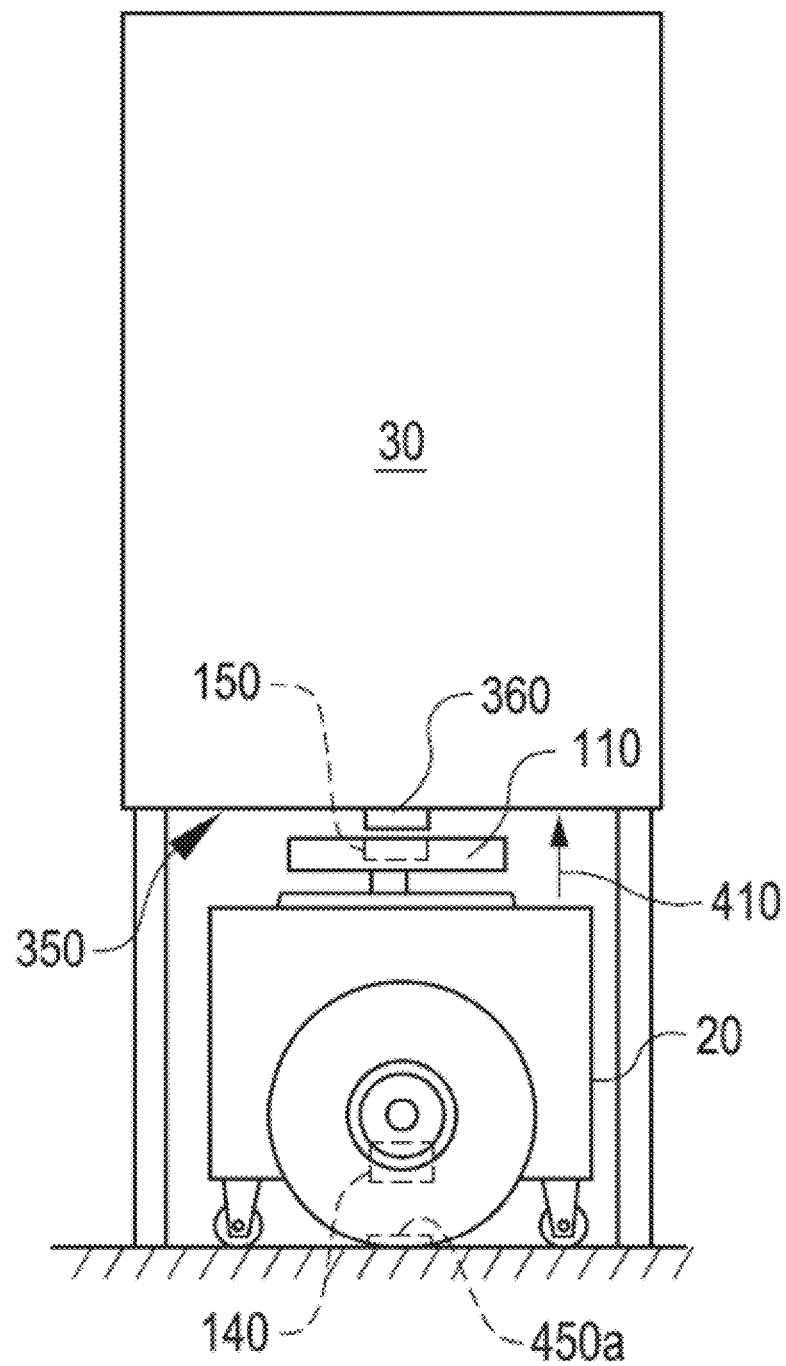

FIGS. 7-9 illustrate operation of particular embodiments of mobile drive unit 20 and inventory holder 30 during docking, movement, and undocking.

FIG. 7 illustrates mobile drive unit 20 and inventory holder 30 prior to docking. As noted above with respect to FIG. 2, mobile drive unit 20 may receive a command that identifies a location for a particular inventory holder 30. Mobile drive unit 20 may then move to the location specified in the command. Additionally, mobile drive unit 20 may utilize position sensor 140 to determine the location of mobile drive unit 20 to assist in navigating to the location of inventory holder 30.

In particular, FIG. 7 shows mobile drive unit 20 and inventory holder 30 as mobile drive unit 20 approaches the storage location identified by the received command. In the illustrated embodiment, the reference point is marked by fiducial mark 450A which comprises a surface operable to reflect light and which, as a result, can be detected by particular embodiments of position sensor 140 when mobile drive unit 20 is positioned over or approximately over fiducial mark 450A. As noted above, the illustrated embodiment of mobile drive unit 20 utilizes optical sensors, including a camera and appropriate image- and/or video-processing components, to detect fiducial marks 450.

FIG. 8 illustrates mobile drive unit 20 and inventory holder 30 once mobile drive unit 20 reaches fiducial mark 450A. Because, in the illustrated example, fiducial mark 450A marks the location of the reference point to which mobile drive unit 20 is destined, mobile drive unit 20 begins the docking process once mobile drive unit 20 reaches fiducial mark 450A. In the illustrated example, mobile drive unit 20 is configured to dock with inventory holder 30 from a position beneath inventory holder 30 and, as a result, inventory holder 30 is stored so that docking surface 350 is located directly above fiducial mark 450A.

FIG. 9 illustrates operation of mobile drive unit 20 in docking with inventory holder 30. After positioning itself over fiducial mark 450A, mobile drive unit 20 begins the docking process. In the illustrated example, the docking process includes mobile drive unit 20 raising docking head 110 towards docking surface 350, as indicated by arrow 410. Additionally, in the illustrated example, mobile drive unit 20 and inventory holder 30 are configured so that mobile drive unit 20 lifts inventory holder 30 off the ground when mobile drive unit 20 docks with inventory holder 30 and, as a result, mobile drive unit 20 supports the weight of inventory holder 30 while mobile drive unit 20 is docked to inventory holder 30.

Figure 10:
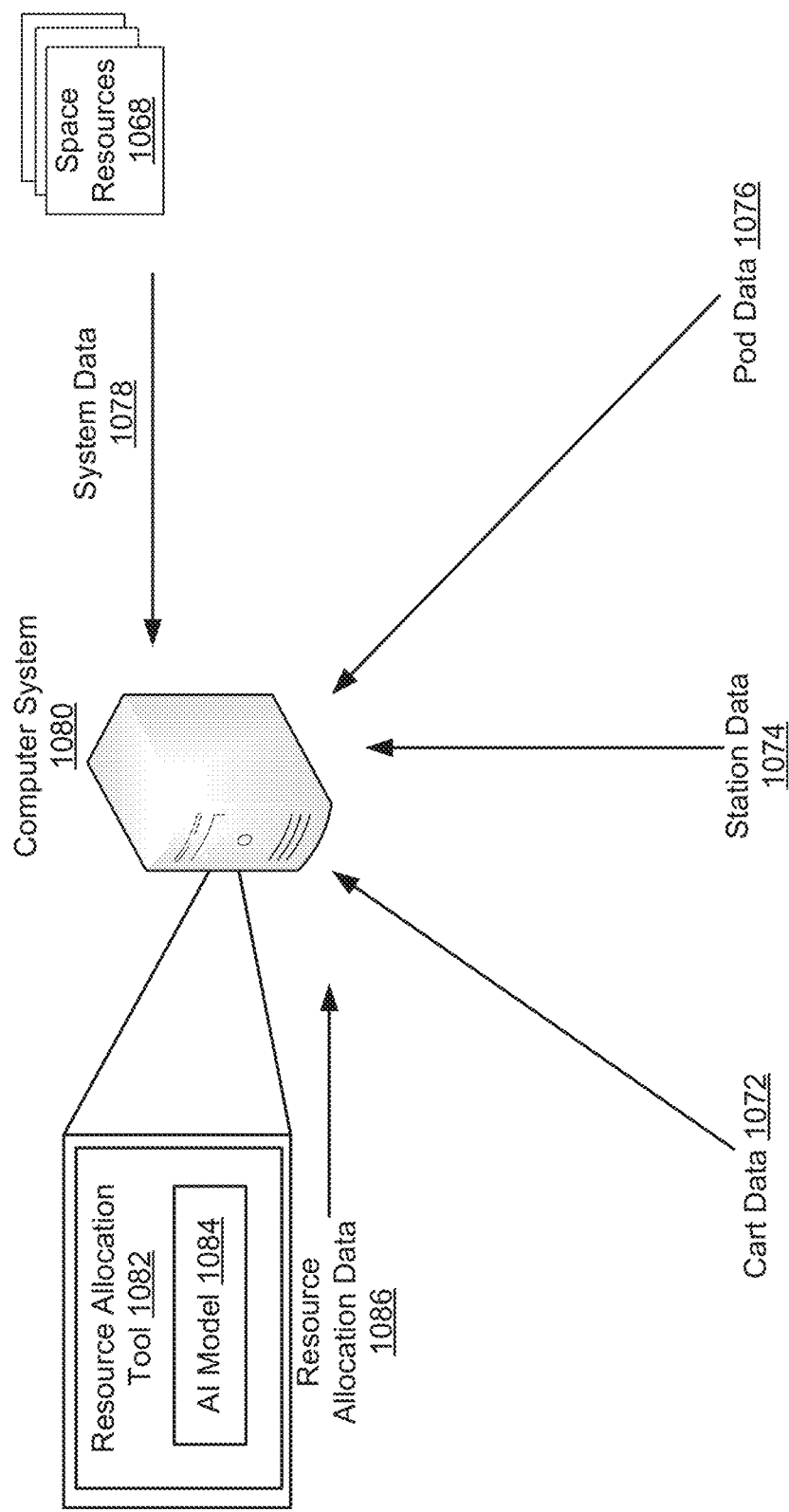
FIG. 10 illustrates an example of a computer system determining resource allocation data for stowing items, according to embodiments of the present disclosure.

FIG. 10 illustrates an example of a computer system 1080 determining resource allocation data 1086 for stowing items, according to embodiments of the present disclosure. The computer system 1080 can be an example of the computer system 180 in FIG. 1 and may implement or communicate with the management module 15 in FIGS. 2 and 3.

In an example, the computer system 1080 receives cart data 1072, station data 1074, pod data 1076, and system data 1078 to generate the resource allocation data 1086. The cart data 1072 can indicate at least one of an item type of one or more items that are to be removed from a cart at an item handling station for stowage, or a packaging sequence of the items in the cart. The cart can have a cart identifier (ID) that can be scanned or otherwise indicated before items are packaged into the cart. Additionally, each item can have an item identifier that can be scanned and sent to the computer system 1080 or indicated to the computer system 1080 before the item is added to the cart, so that the item type and packaging sequence can be determined.

The station data 1074 is associated with the station and/or an operator at the station, and may be attainable by scanning an identification of the operator at the station and sending this identification from the station to the computer system 1080 along with an identifier of the station. The station data 1074 can indicate at least one of a capability of handling the item type, a user experience level (e.g., number of years of service, training completed by the operator, and the like) at the station or an ergonomic parameter associated with the handling. For example, the station data 1074 may indicate a size and location of the station, and some item types may be incapable of being handled at the station if the item is too large or too far from the station. Additionally, the operator may have a better performance (e.g., faster stowage time) for handling items of a particular type, and the ergonomic parameter can indicate the particular item type.

In an example, the pod data 1076 is associated with an item stowage pod that has bins for item stowage. The pod data 1076 can indicate a configuration of the bins in the pod. The pod data 1076 may be received by the computer system 1080 from a central system that tracks configurations and sizes of multiple pods in the space and that deploys mobile drive units to move the pods between different locations in the space.

The computer system 1080 also receives the system data 1078 associated with space resources 1068, which can include carts, pods, stations, and mobile drive units in the space. The system data 1078 can be received from a central computer or from systems associated with each of the carts, pods, stations, and mobile drive units. The system data 1078 indicates at least one of location information carts in the space, an allocation of item stowage pods to stations in the space, a schedule of the allocation, and/or travel paths and schedules of mobile drive units moving the pods in the space. For example, the system data 1078 can indicate that a first pod is allocated to a first station at a first time, a second pod is allocated to a second station at the first time, and the first pod is allocated to a third station at a second time. The system data 1078 may additionally indicate a status of each pod (e.g., whether the pod is currently stowing items, is at least partially free, fill capacity, available bins, status of bins, etc.).

In an example, the computer system 1080 executes the resource allocation tool 1082 to generate the resource allocation data 1086. The resource allocation tool 1082 includes an AI model 1084 that uses the cart data 1072, the station data 1074, the pod data 1076, and the system data 1078 as inputs. The AI model 1084 generates the resource allocation data 1086, which, in an example, includes a set of instructions indicating that a pod is allocated to a station for stowage of items in the cart and a timing of the allocation. The resource allocation data 1086 may include indications of an allocation of multiple pods to multiple stations and a schedule for the allocation. The resource allocation data 1086 may additionally indicate a bin or shelving configuration that a pod is to include, a sequence for unpacking items from the cart, how the pod is to be stowed after the items have been stowed in the pod, or a sequence of packing bins in the pod. The computer system 1080 can send the resource allocation data 1086 to the station, which can output a visible or audible display to the operator associated with the item stowage. For example, the station may output lights indicating the sequence of stowing items and which bin of a pod an item is to be stowed in. The station may additionally or alternatively output a haptic indicator to the operator to indicate the sequence of stowing items. The computer system 1080 can also send the resource allocation data 1086 to the central system to control mobile drive units to pick up and move pods according to a schedule indicated in the resource allocation data 1086. The central system may additionally control mobile drive units for a cart fetch to stage a current cart in a receive buffer zone in the workspace, or to fetch a cart to a station. The central system can instruct a station, a part thereof, or equipment thereof to move or interact with a mobile drive unit. For example, a part of the station may be instructed to move to a level of a mobile drive unit.

Figure 11:
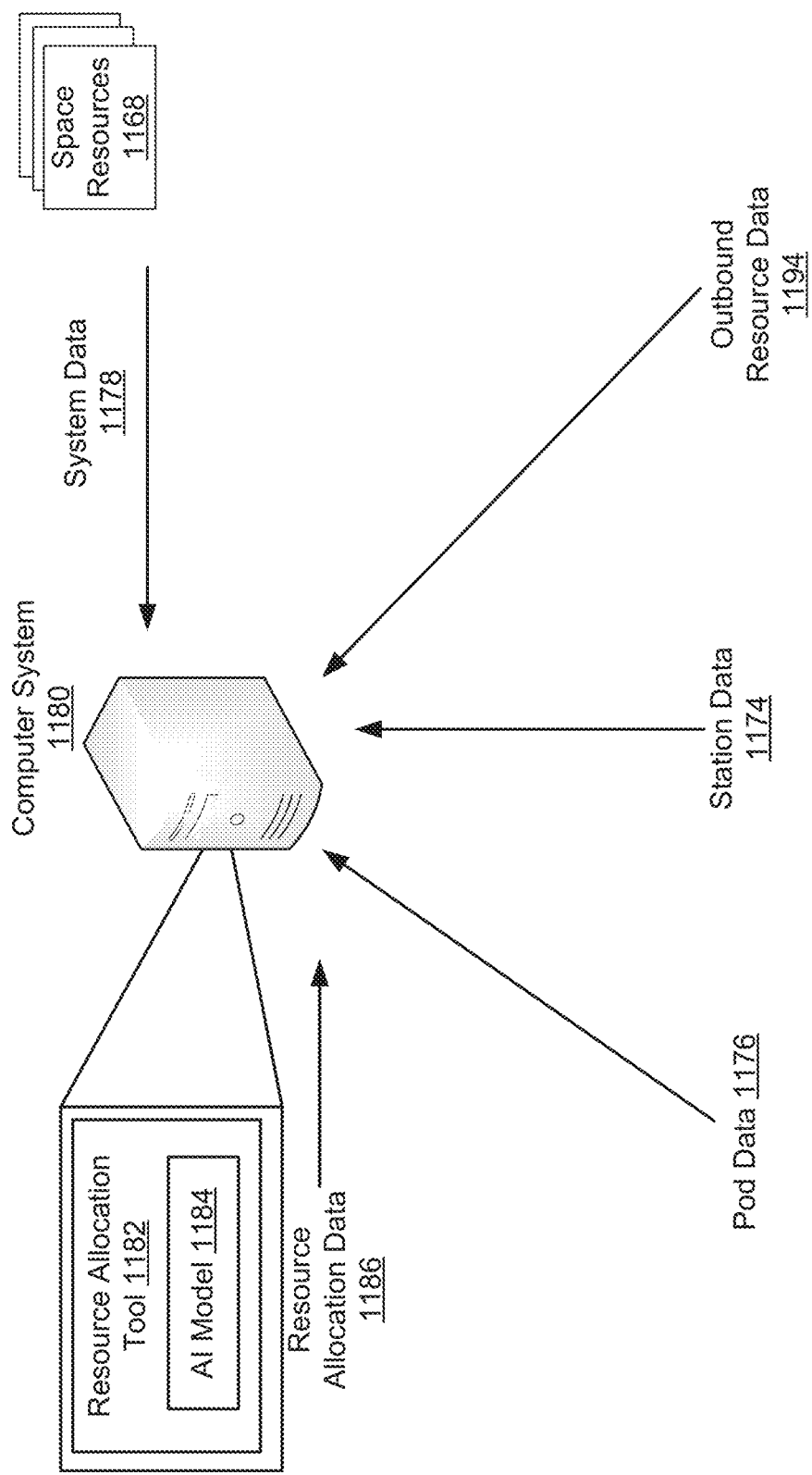
FIG. 11 illustrates an example of a computer system determining resource allocation data for picking items, according to embodiments of the present disclosure.

FIG. 11 illustrates an example of a computer system 1180 determining resource allocation data 1186 for picking items, according to embodiments of the present disclosure. The computer system 1180 can be an example of the computer system 180 in FIG. 1 and may implement or communicate with the management module 15 in FIGS. 2 and 3.

In an example, the computer system 1180 receives pod data 1176, station data 1174, and system data 1178 for space resources 1168, which can be similar to the pod data 1076, the station data 1074, the system data 1078, and the space resources 1068, respectively, as described in FIG. 10. The computer system 1180 can also receive outbound resource data 1194 that indicates information about a resource that picks items from a pod for being packaged into a container, a sortation bin, or another outbound resource. The outbound resource data 1194 can be received from a central computer and/or from the resource (e.g., based on a scan of barcode or an RFID read of an RFID tag on a pod and/or a bin).

The computer system 1180 inputs the pod data 1176, the station data 1174, the outbound resource data 1194, and the system data 1178 into an AI model 1184 of a resource allocation tool 1182. The AI model 1184 outputs resource allocation data 1186 that indicates a sequence of picking items from an item stowage pod or from a bin of the item stowage pod. The resource allocation data 1186 can be sent to the station and usable by the station to display the sequence to an operator. The displaying can be via a user graphical user interface (GUI) and/or via a control system that controls light emission and light curtains according to the resource allocation data 1186. The resource allocation data 1186 can also be used to present audible or haptic outputs about the sequence. Additionally, the resource allocation data 1186 can be sent to a central system associated with the space resources 1168 for controlling mobile drive units to move a pod to a station for picking according to the resource allocation data 1186.

Figure 12:
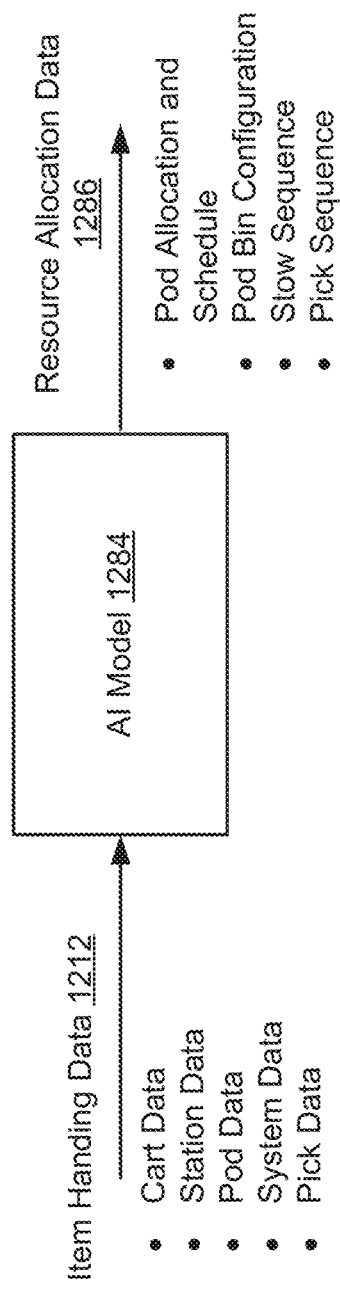
FIG. 12 illustrates an example of an artificial intelligence (AI) model for determining resource allocation data from item handling data, according to embodiments of the present disclosure.

FIG. 12 illustrates an example of an AI model 1284 for determining resource allocation data 1286 from item handling data 1212, according to embodiments of the present disclosure. The AI model 1284 can be executed by a computer system (e.g., the computer system 180, the computer system 1080, or the computer system 1180) as part of a resource allocation tool.

In an example, the AI model 1284 receives the item handling data 1212, which includes one or more of cart data, station data, pod data, system data, or pick data for a space. The AI model 1284 can include one or more machine-learning models trained by reducing a set of deviations observed in training data and an expected performance. Training of the AI model 1284 is further described in FIG. 13. The AI model 1284 can output the resource allocation data 1286 based on the item handling data 1212. The resource allocation data 1286 can be one or more sets of instructions for stowing and/or picking items, and may include one or more of an indication of pod allocation and scheduling, a pod bin configuration, a stow sequence, or a pick sequence. For example, the resource allocation data 1286 can indicate a sequence of stowing items removed from a cart in an item stowage pod and a sequence for picking items from the item stowage pod.

In an example, the output of the AI model 1284 relates to different level and/or schedules of allocations, such as to the allocation of a pod, the allocation of a bin configuration, and the like. The AI model 1284 can include multiple machine learning (ML) models, each of which is trained to output allocation data about one of the levels. Alternatively, the AI model 1284 includes a single ML model trained to output allocation data for all allocation levels. to illustrate, the AI model 1284 may include a first ML model that outputs the sequence of stowing items removed from the cart in the item storage pod, and a second ML model that outputs the sequence for picking the items from the item storage pod.

Figure 13:
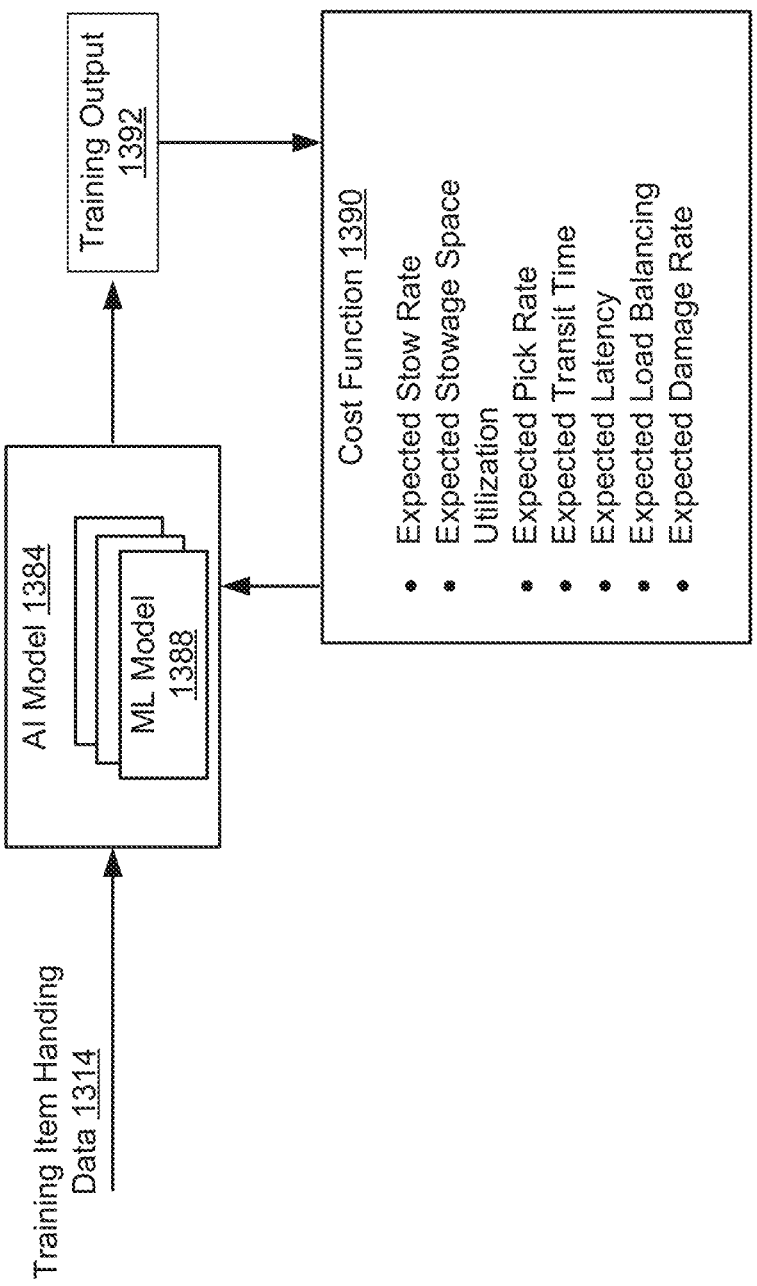
FIG. 13 illustrates an example of training an AI model for determining resource allocation data, according to embodiments of the present disclosure.

FIG. 13 illustrates an example of training an AI model 1384 for determining resource allocation data 1286, according to embodiments of the present disclosure. The AI model 1384 can include one or more ML models 1388, such as a first ML model for determining a sequence of stowing items removed from a cart in an item stowage pod and a second ML model for determining a sequence for picking items from the item stowage pod.

In an example, training the AI model 1384 involves the AI model 1384 receiving training item handling data 1314. The training item handling data 1314 can include at least one of historical cart data, historical station data, historical pod data, or historical system data. Based on the training item handling data 1314, the AI model 1384 generates a training output 1392 of an indication a sequence for stowing and/or picking the items. The training output 1392 is input to a cost function 1390 to output allocation data that is then usable to determine a set of deviations from the predicted performance resulting from the output allocation data and an expected performance. The performance (predicted or expected) can include one or more of a stow rate (e.g., a rate of items stowed in a unit of time, or a rate of items of a particular item type stowed in a unit of time), a stowage space utilization (e.g., a ratio of the volume occupied by stowed items and of the total available stowage volume, or a similar ratio specific to an item type), a pick rate (e.g., a rate of items picked in a unit of time, or a similar rate specific to an item type), a transit time between stow and pick, a dwell time in storage, a latency (e.g., a deviation from a predefined schedule), load balancing (e.g., how items or, more generally, loads are distributed across and/or within pods), a distribution of motion types (e.g., type and repeatability of motions performed by an operator when stowing or picking items from a pod), a damage rate to pods or items, or a resource availability (including a resource, such as a mobile drive unit, becoming unavailable if an item is on the floor or becomes an obstacle in front of the mobile drive unit). The expected performance can be pre-determined (e.g., based on historical observations) for a particular parameter and may be defined for a particular item type. For instance, it can be expected that an operator can store ten items of a particular type in a pod each minute. The predicted performance can be simulated using the allocation data that is output during the training. Additionally or alternatively, for a period of time during which the training data is collected and generated, the allocation data can be also output in parallel and experimentally used to actually handle items and the predicted performance can be measured.

The cost function 1390 may be adjustable using retroactive analysis. For example, for latency, penalties can be associated with latency thresholds. A latency of an item can be determined as a time difference between a target performance and an observed performance for a task (e.g., a difference between an expected time needed to stow an item to an actual time it took to stow the item for a stow task, or a difference between an expected time for an item being removed from stowage and placed on a delivery time to the time actually needed to do so for an outbound task, and the like) Depending on how late an item was based on a comparison of the latency to a latency threshold, an associated penalty can be applied. The thresholds and/or penalties are adjustable by a user based on item priorities (e.g., customer promise to deliver in two days) and a dollar cost to deliver the item or of item cancelation. Then, an observed latency can be compared to the priority and dollar cost, which can be used by the user to adjust the thresholds or penalties. For example, a first latency for an outbound task greater than a first latency threshold results in an order cancelation, whereas a second latency smaller than the first latency but yet greater than a second threshold and results in an added delivery cost. In this example, the first latency can be associated with a higher penalty than the second one. By performing retroactive analysis to determine latencies and impacts (e.g., costs, delivery promise violations, etc.), the latency thresholds and associated penalties can be dynamically adjusted by the user. By performing such an adjustment, weights of connection between nodes at different layers of an ML model can be properly updated.

A first ML model of the ML models 1388 can be trained for indicating a sequence of stowing items removed from the cart in the item stowage pod. To do so, the first ML model can be trained based on training item handling data 1314 that includes historical data associated with at least one of item stowage or item pick (e.g., the training need not be limited to data about stowage tasks, but can also be extended or specific to pick tasks; in this way, the output of this ML model can improve the performance impact to downstream systems). Additionally, a second ML model of the ML models 1388 can be trained for indicating a sequence for picking the items from the item stowage pod, and the training item handling data 1314 can include historical data associated with at least one of the item stowage or the item pick (e.g., here also, the training need not be limited to data about pick tasks, but can also be extended or specific to stowage tasks; in this way, the output of this ML model can improve the performance impact to upstream systems). Of course, these two models are described for illustrative purpose. Additional ML models or a single ML model can be trained.

Generally, each ML model of the AI model 1384 is trained to output allocation data at a particular allocation level(s) (e.g., an ML model to output allocation data related to the deployment of pods for item stow, an ML model to output allocation data related to the deployment of pods for item pick, an ML model to output allocation data related to bin configuration, an ML model to output allocation data related to item sequence handling, an ML model to output a combination of such allocation data, and the like). An ML model is trained by reducing a cost function 1390 associated with that ML model. The cost function 1390 can depend on the type of output for which the ML model is trained. In an example, the cost function can involve an expression of a difference (e.g., root mean square error) between an expected performance and a predicted performance. The specific performance metric (e.g., whether a stow rate, a pick rate, a transit time, a dwell time in storage, a latency, load balancing, a distribution of motion types, a damage rate, a resource availability, or a stowage space utilization) can depend on the output type. For instance, to train an ML model to output allocation data related to the deployment of pods for item stow, the performance metric can be the stow rate. To train an ML model to output allocation data related to bin configuration or item handling sequence, the performance metric can be the stowage space utilization. To train an ML model to output allocation data related to the deployment of pods for item pick, the performance metric can be the pick rate. Yet, to train a single ML model for all three levels of allocation data, the cost function can involve a combination of three differences (e.g., a linear combination or a weighted linear combination), one using the stow rate, one using the stowage space utilization, and one using the pick rate).

In an example, the difference between expected and predicted performances can be used to update parameters of the one or more ML models 1388 of the AI model 1384. For example, a backpropagation algorithm can be used to iteratively update weights of connection between nodes at different layers of an ML model such that the cost function of that ML model is minimized.

Figure 14:
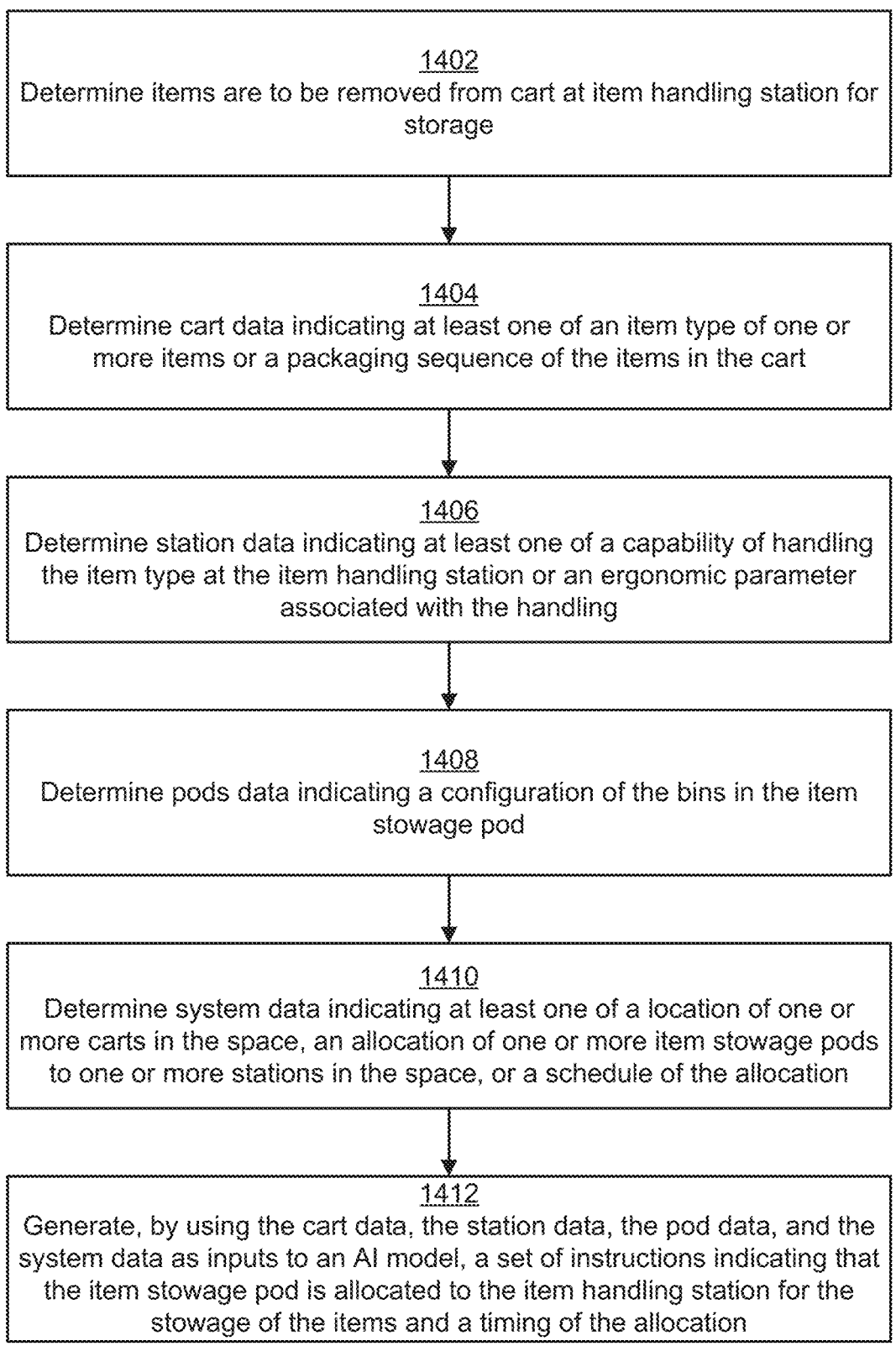
FIG. 14 shows an example of a flow for determining instructions for allocating resources in an item handling environment, according to embodiments of the present disclosure.
Figure 15:
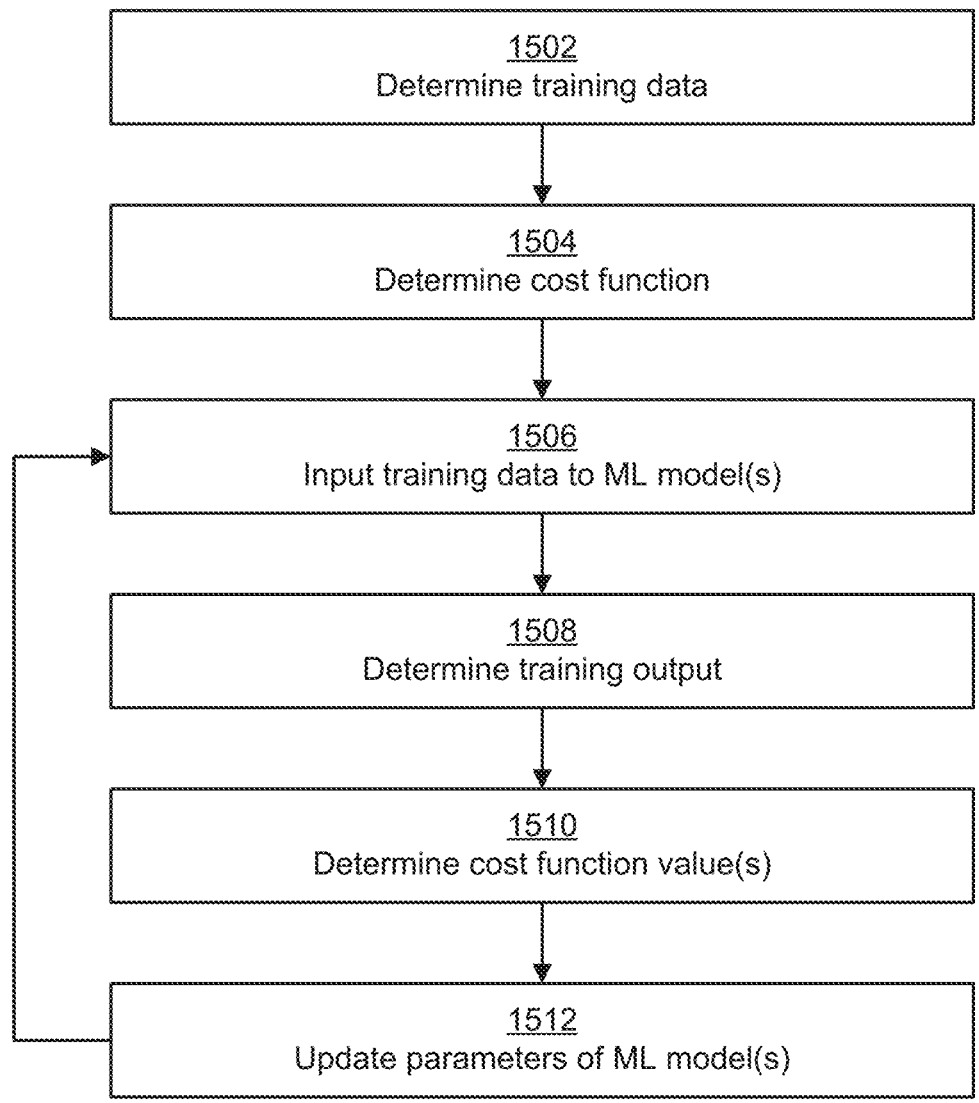
FIG. 15 shows an example of a flow for training an AI model for determining resource allocation data, according to embodiments of the present disclosure.

FIGS. 14 and 15 illustrate examples of flows for aspects of the present disclosure. Operations of the flows can be performed by a computer system, such as the computer system 180. Some or all of the instructions for performing the operations can be implemented as hardware circuitry and/or stored as computer-readable instructions on a non-transitory computer-readable medium of the computer system. As implemented, the instructions represent modules that include circuitry or code executable by processor(s) of the computer system. The use of such instructions configures the computer system to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

FIG. 14 shows an example of a flow for determining instructions for allocating resources in an item handling environment, according to embodiments of the present disclosure. In an example, the flow includes operation 1402, where the computer system determines that items are to be removed from a cart at an item handling station for stowage. The item handling station can receive items from a cart for stowage in an item stowage pod.

In an example, the flow includes operation 1404, where the computer system determines cart data indicating at least one of an item type of one or more of the items or a packaging sequence of the items in the cart. The computer system can determine the cart data based on an identifier associated with the cart.

In an example, the flow includes operation 1406, where the computer system determines station data indicating at least one of a capability of handling the item type at the item handling station or an ergonomic parameter associated with the handling. The ergonomic parameter may be associated with on an operator that removes the items from the cart and stows the items in the item stowage pod and may be determined based on an identifier associated with the operator.

In an example, the flow includes operation 1408, where the computer system determines pod data indicating a configuration of bins in the item stowage pod. The pod data can indicate a number, size, and positioning of the bins in the item stowage pod. The computer system can determine the pod data from a central system that stores pod data for some or all of the pods in a space.

In an example, the flow includes operation 1410, where the computer system determines system data indicating at least one of location information of one or more carts in the space, an allocation of one or more item stowage pods to one or more stations in the space, or a schedule of the allocation. The system data may be determined based on previous resource allocation data determined by the computer system.

In an example, the flow includes operation 1412, where the computer system generates, by using the cart data, the station data, the pod data, and the system data as inputs to an AI model, a set of instructions indicating that the item stowage pod is allocated to the item handling station for the stowage of the items and a timing of the allocation. The set of instructions can be sent to the item handling station for causing an output of a visual, haptic, or audible indication about transferring an item from the cart to the item stowage pod. Additionally, the set of instructions can be sent to a central system for controlling a mobile drive unit that transports the item stowage pod to the item handling station.

Although the flow of FIG. 14 illustrated in connection with a stow task, an allocation of a pod, and a schedule of the allocation, the embodiments of the present disclosure are not limited as such. Instead, and as described herein above, the flow can be similarly applied in connection with a pick task, an allocation of a bin configuration, and/or a sequence of item handling. In particular, and referring the FIGS. 10-13, item handling data ca be input to the AI model, where the item handling data can include any or a combination of cart data, pod data, station data, system data, and outbound resource data, and the AI model can include one or more ML models to output the relevant allocation data.

FIG. 15 shows an example of a flow for training an AI model for determining resource allocation data, according to embodiments of the present disclosure. In an example, the flow includes operation 1502, where the computer system determines training data. The training data can be collected over time from systems of one or more spaces and can include historical cart data, historical station data, historical pod data, and/or historical system data related to item handling in such space(s).

In an example, the flow includes operation 1504, where the computer system determines a cost function. The cost function may be specific to outputting a particular level or type of allocation data. As described i connection with FIG. 13, the cost function can include an expression of a difference between an expected performance and a predicted performance, where the expected performance is predetermined based at least in part on the historical data, and the predicted performance is simulated or measured based on the training output. The definition of the performance can depend on the desired allocation data level/type and can include any of a stow rate, pick rate, a transit time, a dwell time in storage, a latency, load balancing, a distribution of motion types, a damage rate, a resource availability, and/or stowage space utilization.

In an example, the flow includes operation 1506, where the computer system inputs the training data to one or more ML model(s). The one or more ML models may each be associated with determining a different set of instructions. For example, a first ML model may generate an output indicating a sequence of stowing items removed from a cart in the item stowage pod, and a second ML model may generate an output indicating a sequence for picking items from the item stowage pod. Alternatively, there may be one ML model that generates an output that indicates both the sequence for stowing and the sequence for picking the items.

In an example, the flow includes operation 1508, where the computer system determines a training output. The training output can be the indication of the sequence for stowing and/or picking items. The training output may additionally or alternatively be an indication of a utilization of stowage space.

In an example, the flow includes operation 1510, where the computer system determines cost function value(s). For example, the training output is used to simulate or measure the predicted performance. The cost function value(s) can be determined from the cost function, and the value(s) are a set of deviations between the expected performance and the predicted performance.

In an example, the flow includes operation 1512, where the computer system updates parameters of the ML model(s). For example, a backpropagation algorithm is used to update parameter of the ML model(s) (e.g., connection weights) to minimize the cost function(s). After updating the parameters, the process can return to operation 1506, where additional training data is input to the ML model(s) for further tuning of the ML model(s).

Figure 16:
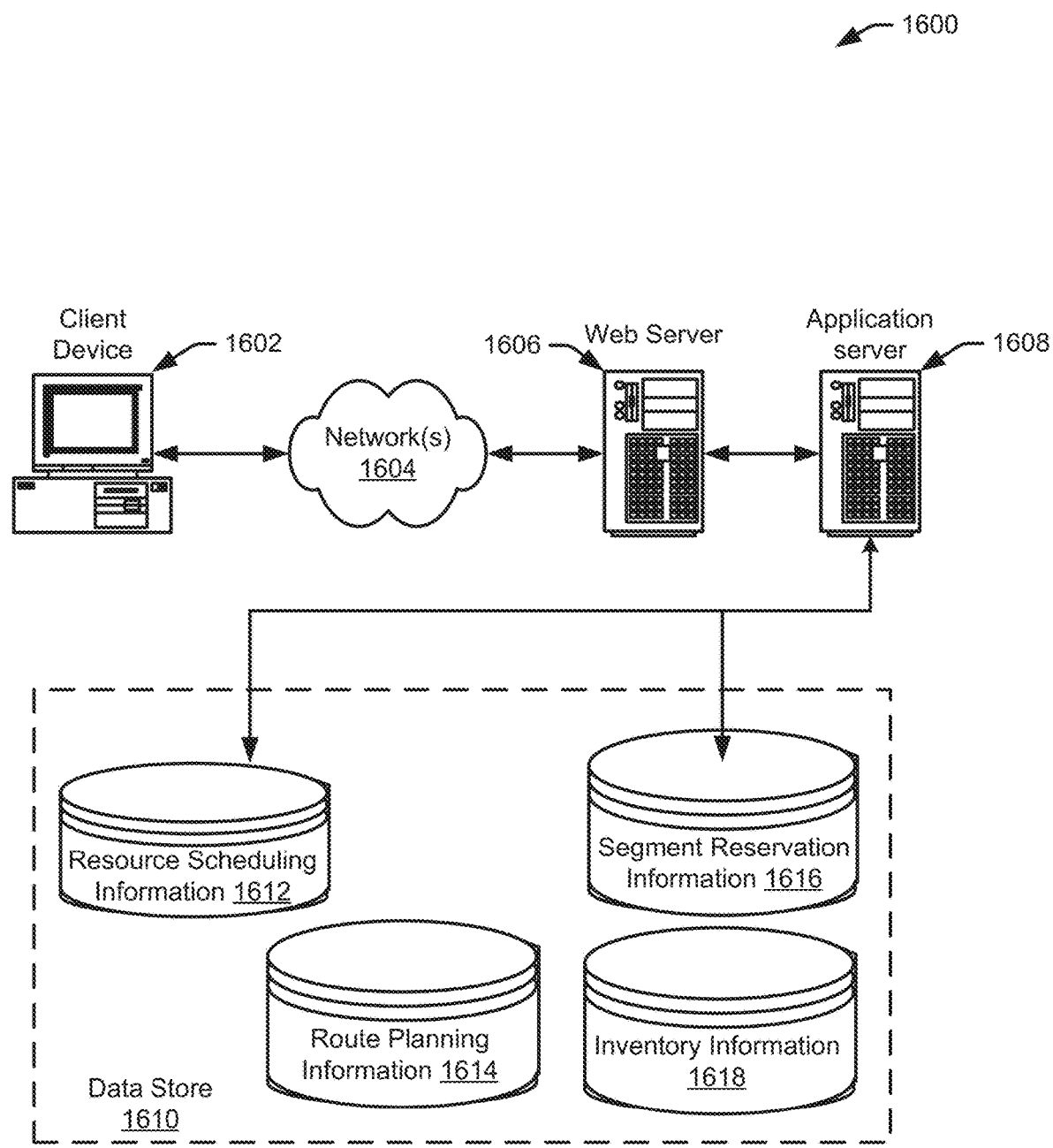
FIG. 16 illustrates an environment in which various features of the inventory system can be implemented, in accordance with at least one embodiment.

FIG. 16 illustrates aspects of an example environment 1600 for implementing aspects in accordance with various embodiments. As will be appreciated, although a Web-based environment is used for purposes of explanation, different environments may be used, as appropriate, to implement various embodiments. The environment includes an electronic client device 1602, which can include any appropriate device operable to send and receive requests, messages, or information over an appropriate network 1604 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1606 for receiving requests and serving content in response thereto, although for other networks an alternative device serving a similar purpose could be used as would be apparent to one of ordinary skill in the art.

The illustrative environment includes at least one application server 1608 and a data store 1610. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1602 and the application server 1608, can be handled by the Web server. It should be understood that the Web and application servers are not required and are merely example components, as structured code discussed herein can be executed on any appropriate device or host machine as discussed elsewhere herein.

The data store 1610 can include several separate data tables, databases or other data storage mechanisms and media for storing data relating to a particular aspect. For example, the data store illustrated includes mechanisms for storing information which can be used by modules described herein, such as resource scheduling information 1612, route planning information 1614, segment reservation information 1616, and/or inventory information 1618. It should be understood that there can be many other aspects that may need to be stored in the data store, such as for page image information and to access right information, which can be stored in any of the above listed mechanisms as appropriate or in additional mechanisms in the data store 1610. The data store 1610 is operable, through logic associated therewith, to receive instructions from the application server 1608 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 16. Thus, the depiction of the system 1600 in FIG. 16 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java©, C, C# or C++, or any scripting language, such as Perl, Python or TCL, as well as combinations thereof. The server(s) may also include database servers, including without limitation those commercially available from Oracle©, Microsoft®, Sybase®, and IBM©.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. An inventory system comprising:
   a computer system comprising one or more processors and one or more memories storing instructions that, upon execution by the one or more processors, configure the computer system to:
   determine that an item is to be transferred at an item handling station from a stowage unit, the item having an item type;
   determine data associated with transferring the item and indicating at least one of: the item type, a sequence of transferring items to or from the stowage unit, capability at the item handling station associated with handling the item type, an ergonomic parameter associated with the handling, a configuration of the stowage unit, an allocation of one or more resources to handle items, or a schedule of the allocation;
   generate, by using the data as input to an artificial intelligence (AI) model, a set of instructions indicating an allocation of a resource to the item handling station for the transferring of the item and a timing of the allocation; and
   cause, based at least in part on the set of instructions, a mobile drive unit to transport the resource to the item handling station such that the item can be removed from the stowage unit and stowed in a bin of the resource.

2. The inventory system of claim 1, wherein the AI model is trained using training data that comprises at least one of: historical cart data, historical station data, historical pod data, or historical system data, wherein the AI model is trained by at least reducing a set of deviations observed in the training data and an expected performance, and wherein the expected performance comprises at least one: a stow rate or a stow space utilization.

3. The inventory system of claim 2, wherein the expected performance is defined for the item type, and wherein the set of instructions further indicate that the item is to be transferred, at the item handling station, from a cart to the stowage unit and a transfer sequence.

4. The inventory system of claim 1, wherein the set of instructions further indicate a sequence of stowing a set of the items from a cart in a bin of the stowage unit, and wherein the item handling station is configured to indicate the sequence of the stowing to a resource that is responsible for the stowing.

5. A computer-implemented method comprising:
   determining that an item is to be transferred at an item handling station from a stowage unit, the item having an item type;
   determining data associated with transferring the item, the data indicating at least one of: the item type, a sequence of transferring items to or from the stowage unit, capability at the item handling station associated with handling the item type, an ergonomic parameter associated with the handling, a configuration of the stowage unit, an allocation of one or more resources to handle items, or a schedule of the allocation;
   generating, by using the data as input to an artificial intelligence (AI) model, a set of instructions indicating an allocation of a resource to the item handling station for the transferring of the item and a timing of the allocation; and
   causing, based at least in part on the set of instructions, a mobile drive unit to transport the resource to the item handling station such that the item can be removed from the stowage unit and stowed in a bin of the resource.

6. The computer-implemented method of claim 5, wherein the stowage unit and the resource are a cart and an item stowage pod, respectively.

7. The computer-implemented method of claim 6, further comprising:
   receiving an output of the AI model based at least in part on the data, the output comprising the set of instructions, wherein the set of instructions further indicates a sequence of stowing items removed from the cart in the bin.

8. The computer-implemented method of claim 6, further comprising:
   receiving an output of the AI model based at least in part on the data, the output comprising the set of instructions, wherein the set of instructions further indicates a bin configuration for use in stowing items removed from the cart in the item stowage pod.

9. The computer-implemented method of claim 5, wherein the stowage unit is an item stowage pod, and further comprising:
receiving an output of the AI model based at least in part on the data, the output comprising the set of instructions, wherein the set of instructions further indicates a sequence of picking items from the item stowage pod or from a bin of the item stowage pod.

10. The computer-implemented method of claim 5, wherein the stowage unit and the resource are a cart and an item stowage pod, respectively, and further comprising:
receiving an output of the AI model based at least in part on the data, the output comprising the set of instructions, wherein the set of instructions further indicates a sequence of stowing items removed from the cart in the item stowage pod and a sequence for picking the items from the item stowage pod.

11. The computer-implemented method of claim 5, wherein the stowage unit and the resource are a cart and an item stowage pod, respectively, and further comprising:
receiving a first output of a first machine learning (ML) model of the AI model based at least in part on the data, the first output indicating a sequence of stowing items removed from the cart in the item stowage pod, wherein the first ML model is trained based at least in part on first historical data associated with at least one of item stowage or item pick; and
receiving a second output of a second ML model of the AI model based at least in part on the data, the second output indicating a sequence for picking the items from the item stowage pod, wherein the second ML model is trained based at least in part on the first historical data or second historical data associated with at least one of the item stowage or the item pick.

12. The computer-implemented method of claim 5, wherein the stowage unit and the resource are a cart and an item stowage pod, respectively, and further comprising:
receiving an output of the AI model based at least in part on the data, the output comprising the set of instructions, wherein the AI model is trained based at least in part on first historical data associated with picking items stowed in item stowage pods.

13. The computer-implemented method of claim 12, wherein the AI model is trained by at least reducing a first set of deviations observed in the first historical data and a first expected performance, and wherein the first expected performance comprises a pick rate.

14. The computer-implemented method of claim 13, wherein the AI model is also trained based at least in part on second historical data associated with stowing items in the item stowage pods by reducing a second set of deviations observed in the second historical data and a second expected performance, and wherein the second expected performance comprises at least one: a stow rate or a stow space utilization.

15. One or more non-transitory computer-readable storage media storing instructions that, upon execution on a system, cause the system to perform operations comprising:
determining that an item is to be transferred at an item handling station from a stowage unit, the item having an item type;
determining data associated with transferring the item, the data indicating at least one of: the item type, a sequence of transferring items to or from the stowage unit, capability at the item handling station associated with handling the item type, an ergonomic parameter associated with the handling, a configuration of the stowage unit, an allocation of one or more resources to handle items, or a schedule of the allocation;
generating, by using the data as input to an artificial intelligence (AI) model, a set of instructions indicating an allocation of a resource to the item handling station for the transferring of the item and a timing of the allocation; and
causing, based at least in part on the set of instructions, a mobile drive unit to transport the resource to the item handling station such that the item can be removed from the stowage unit and stowed in a bin of the resource.

16. The one or more non-transitory computer-readable storage media of claim 15, wherein the stowage unit and the resource are a cart and an item stowage pod, respectively, and wherein the operations further comprise:
receiving an output of the AI model based at least in part on the data, the output comprising the set of instructions, wherein the AI model is trained based at least in part on a latency cost function and an adjustment to penalties of the latency cost function, wherein the adjustment is based at least in part on latency thresholds.

17. The one or more non-transitory computer-readable storage media of claim 15, wherein the stowage unit and the resource are a cart and an item stowage pod, respectively, and wherein the operations further comprise:
receiving an output of the AI model based at least in part on the data, the output indicating a sequence of transferring items from the cart to the item stowage pod or a sequence of transferring the items out of the item stowage pod.

18. The one or more non-transitory computer-readable storage media of claim 15, wherein the stowage unit and the resource are a cart and an item stowage pod, respectively, and wherein the operations further comprise:
receiving an output of the AI model based at least in part on the data, the output indicating a configuration of the item stowage pod for receiving items transferred from the cart.

19. The one or more non-transitory computer-readable storage media of claim 15, wherein the operations further comprise:
causing, based at least in part on the set of instructions, a mobile drive unit to transport the resource to the item handling station, a fetch of another stowage unit, or a change to the item handling station.

20. The one or more non-transitory computer-readable storage media of claim 15, wherein the operations further comprise:
causing, based at least in part on the set of instructions, the item handling station to output a visual, haptic, or audible indication about the transferring of the item from the stowage unit to the resource.

\* \* \* \* \*